(12) United States Patent
Cudd et al.

(10) Patent No.: US 7,903,277 B2
(45) Date of Patent: Mar. 8, 2011

(54) EFFICIENT PRINTING OF FRAMES PAGES

(75) Inventors: Richard Cudd, Sydney (AU); Jeremy David Michael Thorp, Chatswood (AU)

(73) Assignee: Canon Information Systems Research Australia Pty. Ltd., North Ryde, NSW (AU)

( * ) Notice: Subject to any disclaimer, the term of this patent is extended or adjusted under 35 U.S.C. 154(b) by 1578 days.

(21) Appl. No.: 10/668,273

(22) Filed: Sep. 24, 2003

(65) Prior Publication Data

US 2004/0105127 A1 Jun. 3, 2004

(30) Foreign Application Priority Data

Sep. 26, 2002 (AU) ................................ 2002951709

(51) Int. Cl.
*G06K 15/00* (2006.01)
(52) U.S. Cl. ......... 358/1.18; 715/274; 715/238; 715/253
(58) Field of Classification Search .................. 715/274, 715/238–253; 358/1.18
See application file for complete search history.

(56) References Cited

U.S. PATENT DOCUMENTS

| | | | | |
|---|---|---|---|---|
| 5,918,002 A | * | 6/1999 | Klemets et al. | 714/18 |
| 5,959,630 A | * | 9/1999 | Takeuchi et al. | 715/835 |

(Continued)

FOREIGN PATENT DOCUMENTS

AU 761635 6/2003

(Continued)

OTHER PUBLICATIONS

"Internet Explorer" Web page located at http://www.msdn.microsoft.com/ie/ or http://www.msdn.microsoft.com/nhp/default.asp?contentid=28000441&frame=true (original publication date unknown, printed from Internet on Nov. 20, 2003).

(Continued)

*Primary Examiner* — David K Moore
*Assistant Examiner* — Benjamin O Dulaney
(74) *Attorney, Agent, or Firm* — Fitzpatrick, Cella, Harper & Scinto

(57) ABSTRACT

Disclosed is a method (1900) of forming a printable representation of a document (1800) having framed content (1808). The method includes recording (1904) the position, height and width of each frame of the document in a display window in which the document is presented. The dimensions of a printing medium associated with the printable representation are also identified. A height of content of each frame is determined and, for each frame, a record of any corresponding dependency frames, each dependency frame being above the frame in the display window. The records are then interpreted to establish a display order of the frames. For each frame (1908), and in the display order, a number of subsidiary steps are then performed, those being (a) checking a start position of the frame against an end position of a created display region of a frame upon which the frame is dependent, and setting the start position to be the end position (1910, 1912), (b) creating a display region upon a page in the printable representation at the start position according to the corresponding content height, (c) placing the content of the frame into the display region (1914); and (d) where the display region exceeds a page limit in the printable representation (1916), terminating the display region at the page limit and creating a further display region upon a following page of the printable representation.

14 Claims, 19 Drawing Sheets

U.S. PATENT DOCUMENTS

| | | | | |
|---|---|---|---|---|
| 6,133,913 | A | 10/2000 | White et al. | 345/327 |
| 6,185,589 | B1 | 2/2001 | Votipka | 707/517 |
| 6,243,761 | B1 | 6/2001 | Mogul et al. | 709/246 |
| 6,636,863 | B1* | 10/2003 | Friesen | 707/102 |
| 6,765,691 | B2* | 7/2004 | Kubo et al. | 358/1.9 |
| 6,801,224 | B1* | 10/2004 | Lewallen | 715/746 |
| 6,832,351 | B1* | 12/2004 | Batres | 715/234 |
| 6,978,445 | B2* | 12/2005 | Laane | 717/131 |
| 7,020,697 | B1 | 3/2006 | Goodman et al. | 709/223 |
| 7,047,033 | B2* | 5/2006 | Wyler | 455/552.1 |
| 7,243,300 | B1* | 7/2007 | Metcalfe et al. | 715/201 |
| 7,263,659 | B2* | 8/2007 | Hull et al. | 715/716 |
| 7,685,514 | B1* | 3/2010 | Khatwani et al. | 715/251 |
| 2001/0049703 | A1* | 12/2001 | Miyoshi et al. | 707/527 |
| 2002/0036662 | A1* | 3/2002 | Gauthier et al. | 345/835 |
| 2002/0046238 | A1* | 4/2002 | Estavillo et al. | 709/203 |
| 2002/0070961 | A1* | 6/2002 | Xu et al. | 345/738 |
| 2002/0109680 | A1* | 8/2002 | Orbanes et al. | 345/418 |
| 2002/0143814 | A1* | 10/2002 | Hepworth et al. | 707/512 |
| 2002/0176112 | A1* | 11/2002 | Miura | 358/1.18 |
| 2002/0194081 | A1* | 12/2002 | Perkowski | 705/26 |
| 2002/0198720 | A1* | 12/2002 | Takagi et al. | 704/270.1 |
| 2003/0050893 | A1* | 3/2003 | Hirabayashi | 705/52 |
| 2003/0053102 | A1* | 3/2003 | Kelsey | 358/1.13 |
| 2003/0055876 | A1* | 3/2003 | Korala et al. | 709/203 |
| 2003/0058277 | A1* | 3/2003 | Bowman-Amuah | 345/765 |
| 2003/0058469 | A1* | 3/2003 | Buis et al. | 358/1.15 |
| 2003/0158957 | A1* | 8/2003 | Abdolsalehi | 709/231 |
| 2003/0174346 | A1 | 9/2003 | Nagatani | 358/1.2 |
| 2004/0015782 | A1* | 1/2004 | Day et al. | 715/517 |
| 2004/0019851 | A1* | 1/2004 | Purvis et al. | 715/517 |
| 2004/0021679 | A1* | 2/2004 | Chapman et al. | 345/700 |
| 2004/0201613 | A1* | 10/2004 | Simpson et al. | 345/738 |
| 2004/0205633 | A1* | 10/2004 | Martinez et al. | 715/526 |
| 2005/0010093 | A1* | 1/2005 | Ford et al. | 600/345 |

FOREIGN PATENT DOCUMENTS

| | | |
|---|---|---|
| JP | 2000-099232 | 4/2000 |
| JP | 2002-063016 | 2/2002 |
| WO | WO 0288979 | 11/2002 |
| WO | WO 02101567 | 12/2002 |

OTHER PUBLICATIONS

"Get more from the Web with Internet Explorer 6" Web page located at http://www.microsoft.com/windows/ie/default.asp (updated Nov. 11, 2003).

* cited by examiner

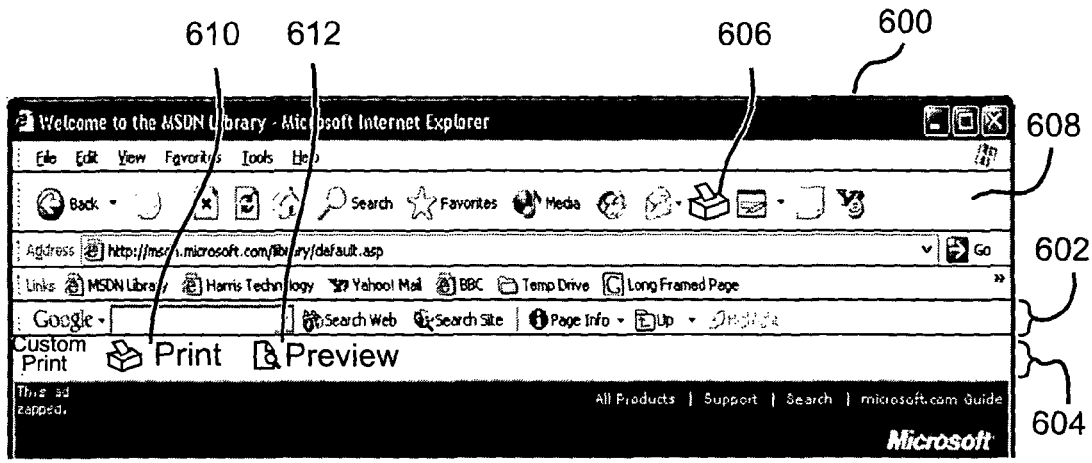
Fig. 6
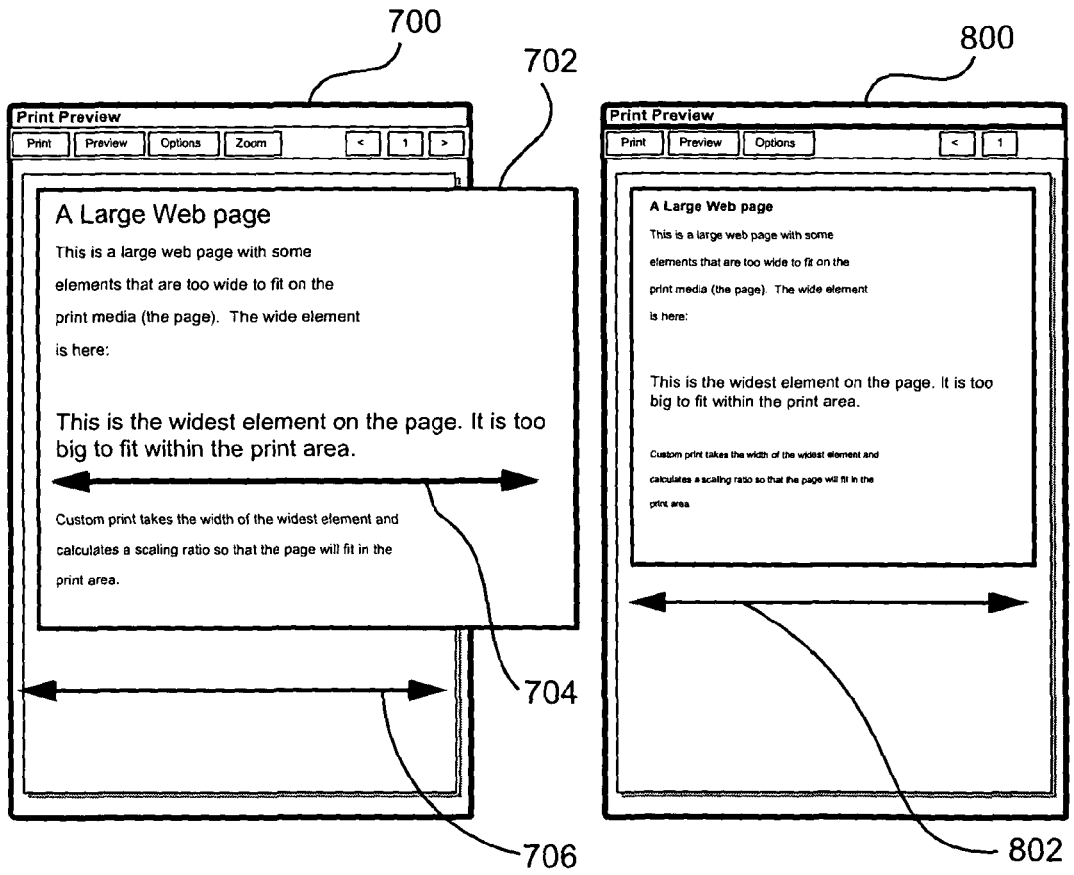
Fig. 7
(Prior Art)
Fig. 8

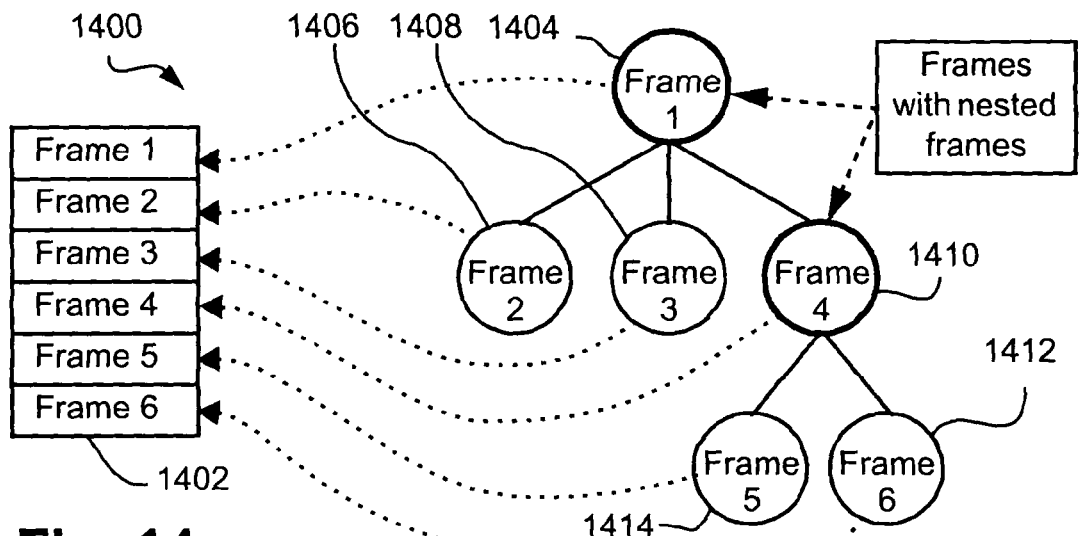
Fig. 14
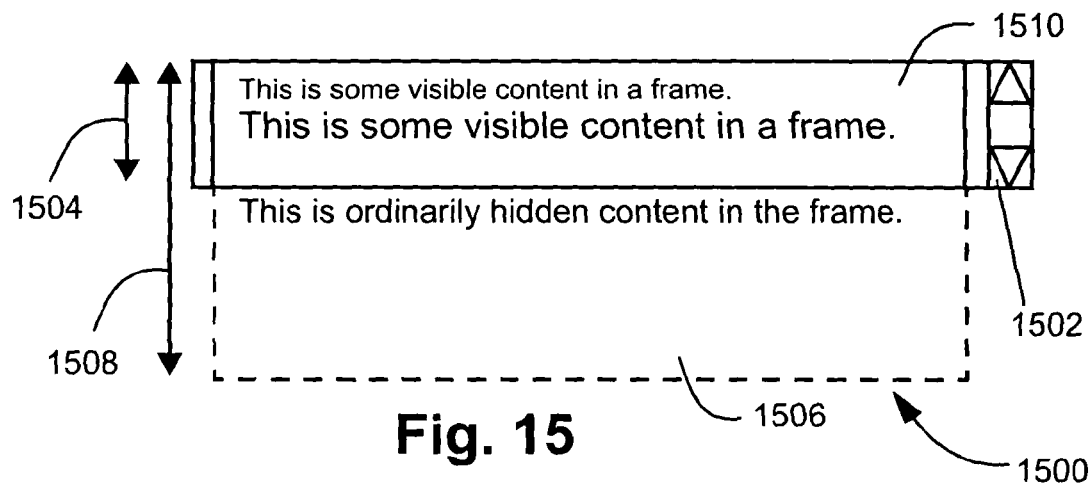
Fig. 15
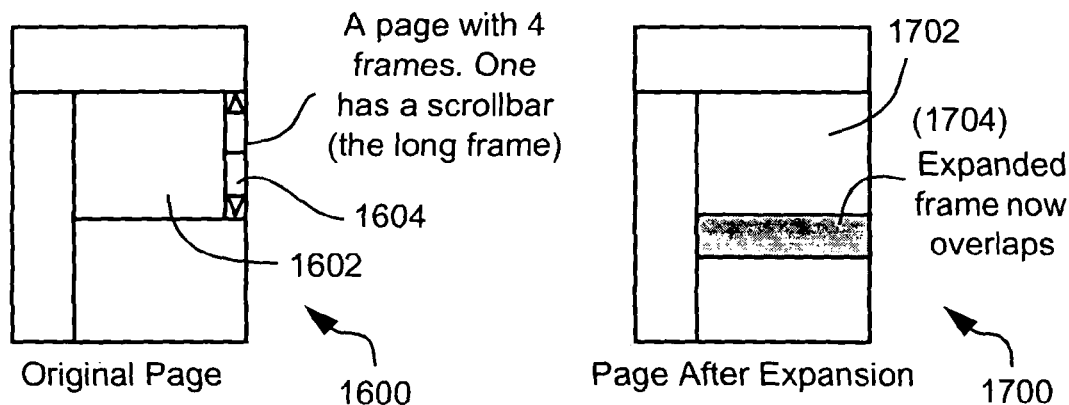
Fig. 16
Fig. 17

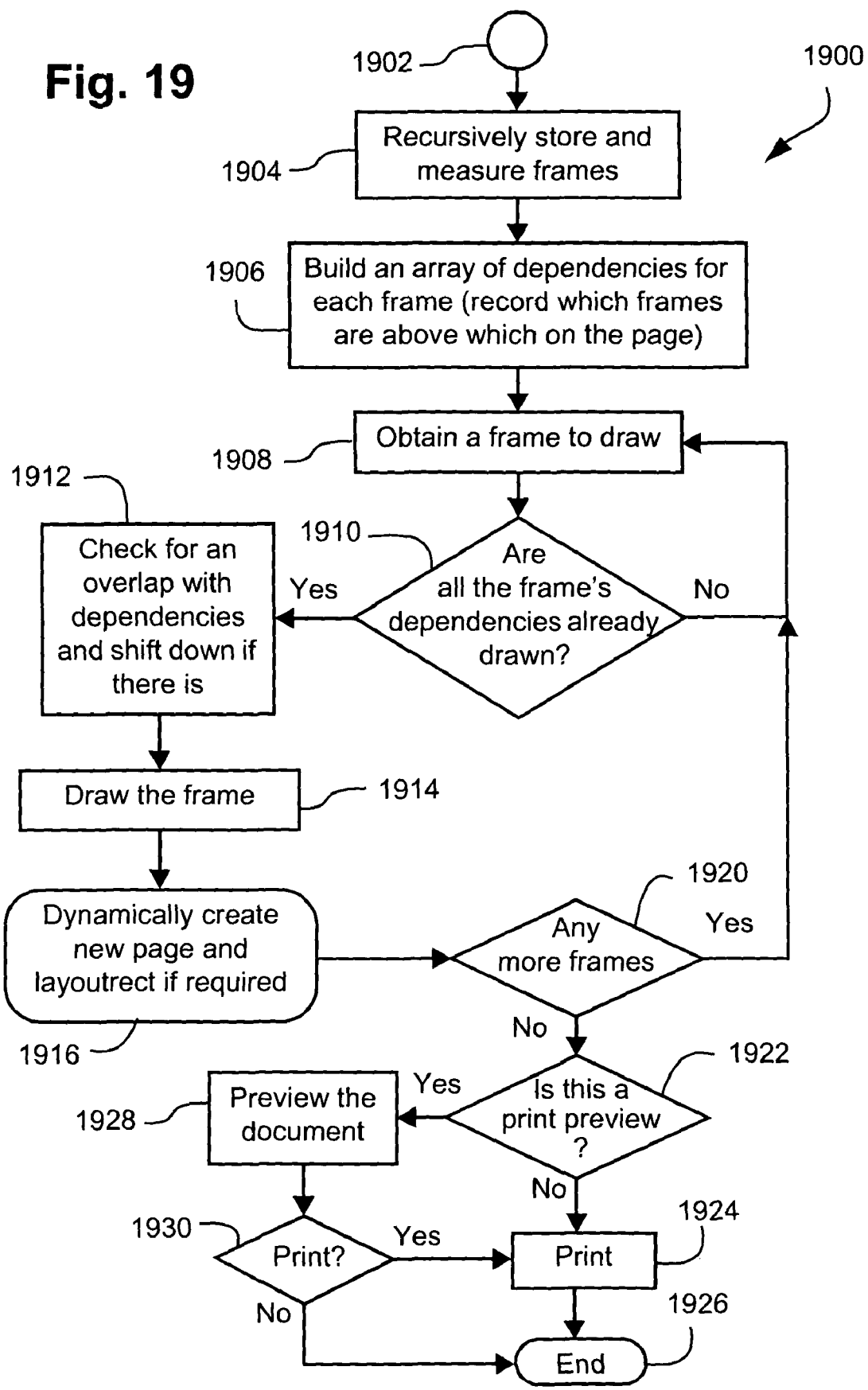

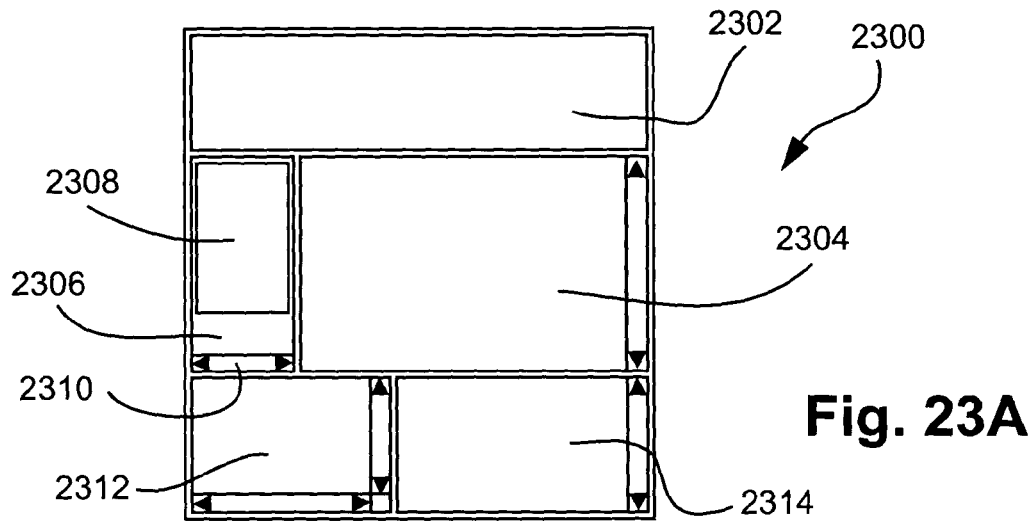
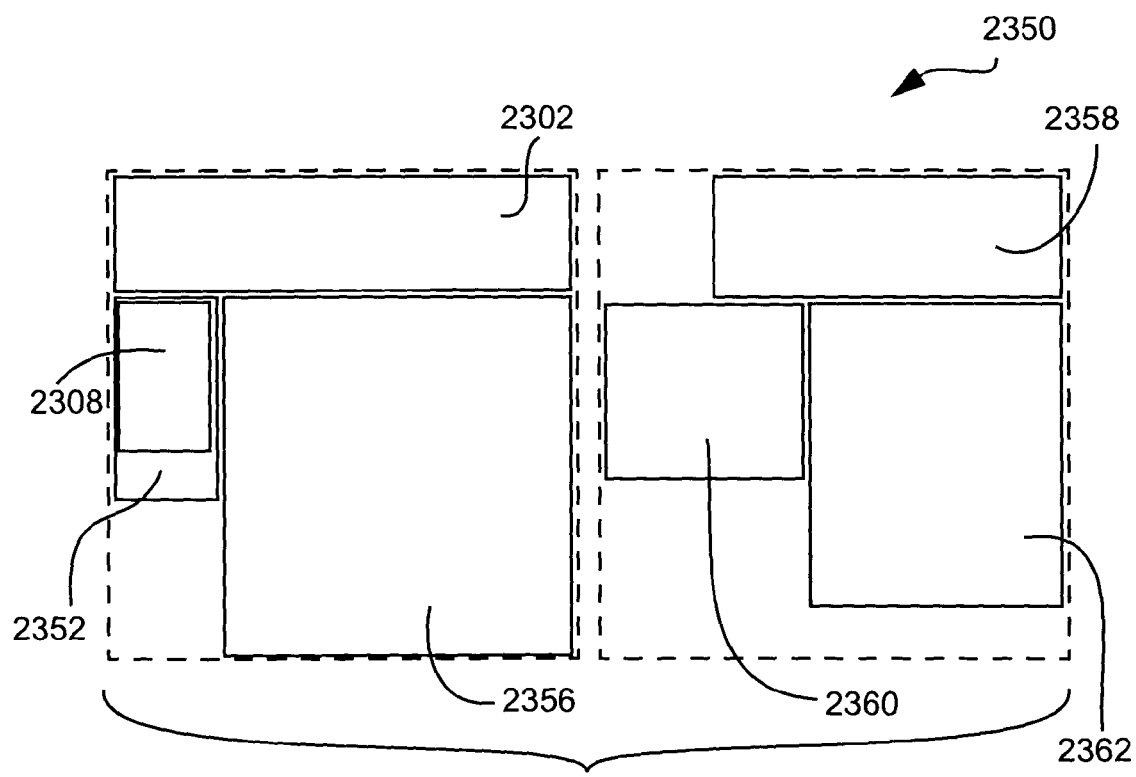

EFFICIENT PRINTING OF FRAMES PAGES

COPYRIGHT NOTICE

This patent specification contains material that is subject to copyright protection.

The copyright owner has no objection to the reproduction of this patent specification or related materials from associated patent office files for the purposes of review, but otherwise reserves all copyright whatsoever.

FIELD OF THE INVENTION

The present invention relates generally to the printing of Web pages found on the World Wide Web and like computer networks and, in particular, to arrangements that efficiently accommodate for the existence and variable nature of frames, as are often found in such web pages. The present invention also relates to a method and apparatus for enabling printing of frames pages, and to a computer program product including a computer readable medium having recorded thereon a computer program for printing frames pages.

BACKGROUND

The World Wide Web (the "Web") represents a vast repository of information accessible to users of the Internet and other computer networks. Information available on the Web is generally formatted according to well known standards and processes such as HTML and JavaScript, and applications such as plug-ins and applets. In spite of standards being followed, users often encounter problems when accessing or viewing Web pages and/or specific content contained on such pages. In some instances such problems arise from the computer browser application being operated by the user to access Web pages. One such problem that often arises occurs when a user selects to print a Web page only to find that the printed matter does not correspond with that displayed on the video screen to the user by the browser.

The problems of printing arise generally from two aspects of the Web page in question. Firstly, Web pages are often formatted to optimise display on a computer display screen, which has a different width to that of printing media, such as A4-size paper. As a consequence, Web pages are often too wide to fit completely on the paper. Another problem, also associated with width, is the presence of frames within Web pages and that when printing such pages, content within frames and which is desired to be seen, is often cropped or contain scroll bars.

Current attempts to resolve these problems include gross scaling of page elements and the separate printing of individual page elements. Such approaches are unsatisfactory in that gross scaling can reduce size to useless levels and separate printing results in a loss of structure of the Web page and hence the user's ability to subsequently traverse the Web elements when in hard copy form.

SUMMARY

It is an object of the present invention to substantially overcome, or at least ameliorate, one or more disadvantages of existing arrangements.

Disclosed are arrangements which seek to address the above problems by dynamically adjusting the scale of individual frames and their height so that a width of the print media is not exceeded whilst substantially maintaining the layout of the Web page as presented to the user upon the display screen.

According to one aspect of the present invention, there is provided a method of forming a printable representation of a document having framed content, said method comprising the steps of:

(a) recording the position, height and width of each frame of said document in a display window in which said document is presented, (b) identifying dimensions of a printing medium associated with said printable representation;

(c) determining a height of content of each said frame;

(d) determining, for each said frame, a record of any corresponding dependency frames, each said dependency frame being above said frame in said display window;

(e) interpreting the records to establish a display order of said frames;

(f) for each said frame, and in said display order:

(fa) checking a start position of said frame against an end position of a created display region of a frame upon which said frame is dependent, and setting said start position to be said end position;

(fb) creating a display region upon a page in said printable representation at said start position according to said corresponding content height;

(fc) placing the content of said frame into said display region; and (fd) where said display region exceeds a page limit in said printable representation, terminating the display region at the page limit and creating a further display region upon a following page of the printable representation.

Other aspects of the invention are also disclosed.

BRIEF DESCRIPTION OF THE DRAWINGS

Some aspects of the prior art and one or more embodiments of the present invention will now be described with reference to the drawings, in which:

FIG. 6 shows a modified Web browser toolband incorporating the custom print option of the present disclosure;

FIG. 7 illustrates the prior art problem of excessive width;

FIG. 8 shows a correction to the with of FIG. 7 according to the present disclosure;

FIG. 14 schematically illustrates a flattening of a nested tree structure of frames according to the present disclosure;

FIG. 15 illustrates a mechanism of expanding long frames;

FIGS. 16 and 17 show the change to a page including overlap after expansion according to the present disclosure;

FIG. 19 is a flow diagram of a method of printing frames pages according to the present disclosure;

FIGS. 23A and 23B depict horizontal overlap and its handling according to the present disclosure.

DETAILED DESCRIPTION INCLUDING BEST MODE

Figure 1:
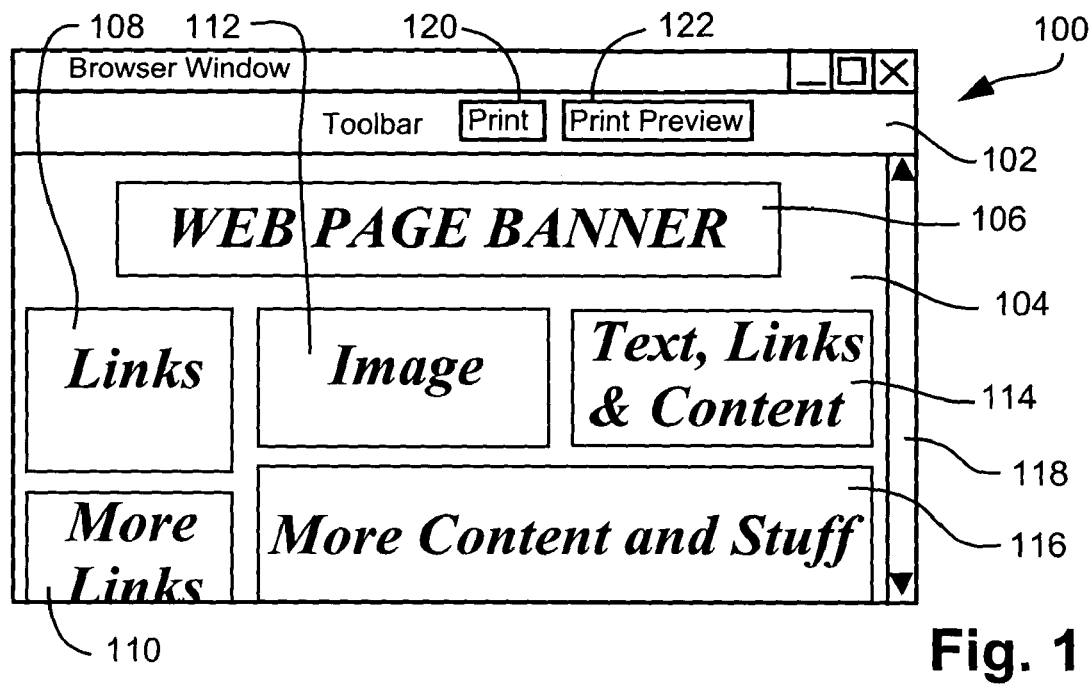
FIG. 1 depicts a typical Web page viewed from a prior art browser window.

Where reference is made in any one or more of the accompanying drawings to steps and/or features, which have the same reference numerals, those steps and/or features have for the purposes of this description the same function(s) or operation(s), unless the contrary intention appears.

Figure 21:
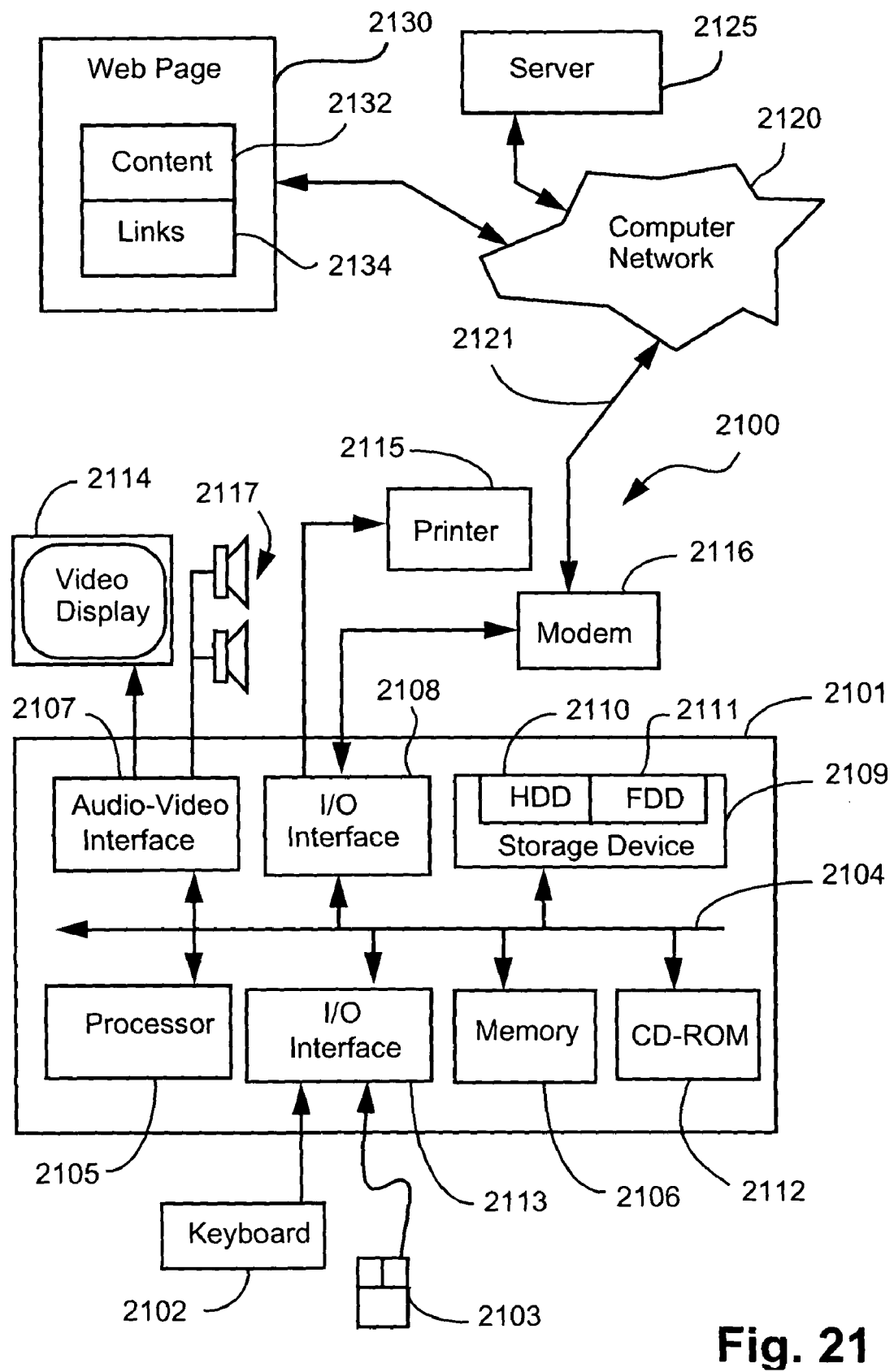
FIG. 21 is a schematic block diagram of a general purpose computer and associated computer network upon which the arrangements described can be practiced.

The method and processes of Web browsing and printing described herein are typically practiced using a general-purpose computer system, such as the system 2100 shown in FIG. 21. The processes of browsing and printing are typically implemented using software, such as one or more application programs executing within the computer system 2100. In particular, the methods and processes are effected by instructions in the software that are carried out by the computer. The instructions may be formed as one or more code modules, each for performing one or more particular tasks. The software may also be divided into three separate parts, in which a first part performs the browsing methods, a second part which handles the printing of Web pages, and a third part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for Web printing.

The computer system 2100 is formed by a computer module 2101, input devices such as a keyboard 2102 and mouse 2103, and output devices including a printer 2115, a display device 2114 and loudspeakers 2117. A Modulator-Demodulator (Modem) transceiver device 2116 is used by the computer module 2101 for communicating to and from a communications network 2120, for example connectable via a telephone line 2121 or other functional medium. The modem 2116 can be used to obtain access to the Internet, the Web, and other network systems, such as a Local Area Network (LAN) or a Wide Area Network (WAN), and may be incorporated into the computer module 2101 in some implementations.

The computer module 2101 typically includes at least one processor unit 2105, and a memory unit 2106, for example formed from semiconductor random access memory (RAM) and read only memory (ROM). The module 2101 also includes an number of input/output (I/O) interfaces including an audio-video interface 2107 that couples to the video display 2114 and loudspeakers 2117, an I/O interface 2113 for the keyboard 2102 and mouse 2103 and optionally a joystick (not illustrated), and an interface 2108 for the modem 2116 and printer 2115. In some implementations, the modem 2116 may be incorporated within the computer module 2101, for example within the interface 2108. A storage device 2109 is provided and typically includes a hard disk drive 2110 and a floppy disk drive 2111. A magnetic tape drive (not illustrated) may also be used. A CD-ROM drive 2112 is typically provided as a non-volatile source of data. The components 2105 to 2113 of the computer module 2101, typically communicate via an interconnected bus 2104 and in a manner which results in a conventional mode of operation of the computer system 2100 known to those in the relevant art. Examples of computers on which the described arrangements can be practised include IBM-PC's and compatibles, Sun Sparcstations or alike computer systems evolved therefrom.

Typically, the browser application program, by which a user of the computer 2100 accesses the Web, is resident on the hard disk drive 2110 and read and controlled in its execution by the processor 2105. Intermediate storage of the program and any data fetched from the network 2120 may be accomplished using the semiconductor memory 2106, possibly in concert with the hard disk drive 2110. In some instances, the browser program may be supplied to the user encoded on a CD-ROM or floppy disk and read via the corresponding drive 2112 or 2111, or alternatively may be read by the user from the network 2120 via the modem device 2116. Still further, the software can also be loaded into the computer system 2100 from other computer readable media. The term "computer readable storage medium" as used herein refers to any storage medium that participates in providing instructions and/or data to the computer system 2100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2101. Examples of transmission media that can participate in the provision of instructions or data include radio or infra-red transmission channels as well as a network connection to another computer or networked device, and the Internet or Intranets including e-mail transmissions and information recorded on Websites and the like.

As seen in FIG. 21, the modem 2116 enables a user of the computer 2100 to access a Web page 2130 via the network 2120. The Web page may be resident on a server computer 2125 (shown separately) and accessible via a Web address defined by a Uniform Resource Locator (URL) to thereby reproduce content 2132 to the user. Typically, the browser application activates a graphical user interface (GUI) on the video display 2114 of the computer system 2100 which displays the content 2132 and any associated links 2134 to the user. Most commercially available browser applications include functionality to enable printing of the Web page 2130 on the user's local printer 2115.

FIG. 1 shows a browser GUI window 100 as might be typically found reproduced by the video display 2114 during a Web browsing session using a prior art browser. The window 100 includes a tool bar 102 having numerous user selectable icons for instigating certain functionality. Two of those icons as illustrated include a print icon 120 and a print preview icon 122. Actuation of the print icon 120 causes a printing of the currently displayed Web page on the printer 2115 according to the printing schema associated with the web browser application. Selection of the print preview icon 122 results in the web browser application instigating a process to provide the user with a further window upon the display 2114 in which an actual layout of the document to be printed may be viewed. The print function 120 and the print preview function 122 are well known in the art not only in the field of browser applications but also in desktop publishing and word processing applications.

In FIG. 1, a web page 104 is displayed which includes a number of content items, those being a web page banner 106, a number of links 108, an image 112, more links 110, text links and content 114, and more content and stuff 116. As can be seen from FIG. 1, each of the content items within the web page 104 fit within the width of the page but the two of the content items 110 and 116 extend beyond the length of the window 100. This necessitates the incorporation of a vertical scroll bar 118 so that a user can manipulate the mouse pointer 2103 or the keyboard 2102, to scroll down the web page 104 to review that content of that web page 104 that is presently obscured.

Figure 2A:
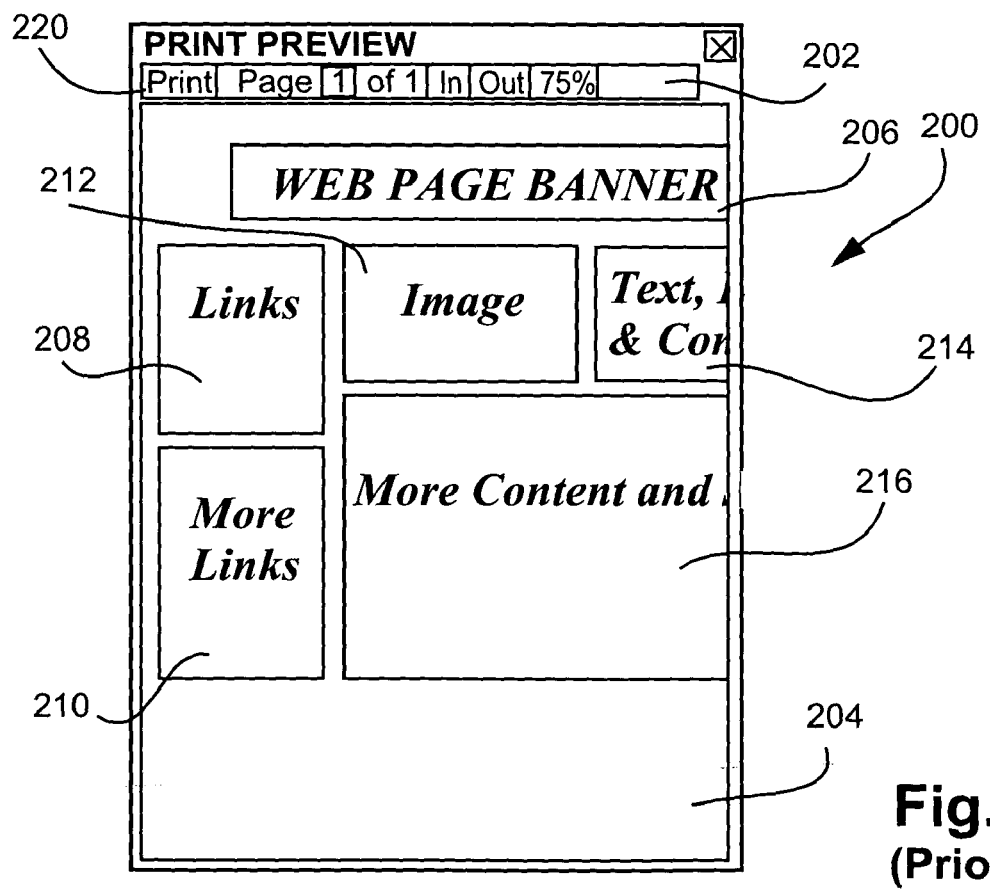
FIG. 2A shows a prior art print preview of the Web page of FIG. 1.

FIG. 2A depicts a print preview display 200 of the web page 104 of FIG. 1. The print preview display 200 includes a limited toolbar 202 incorporating functionality commonly found with print preview displays. Significantly, it is seen from FIG. 2A that, in creating the print preview display 200, the prior art browser application takes no account for the width of the web page 104 and the width of the print medium (eg. A4 sized paper) upon which the web page is to be hardcopy reproduced. In this regard, whilst the content items 208, 210 and 212 are shown in their entirety, each of the content items 206, 214 and 216 extend beyond the right hand edge of the printable page and, as a consequence, the print preview function of the web browser application has clipped that content in line with the page boundary.

Figure 2B:
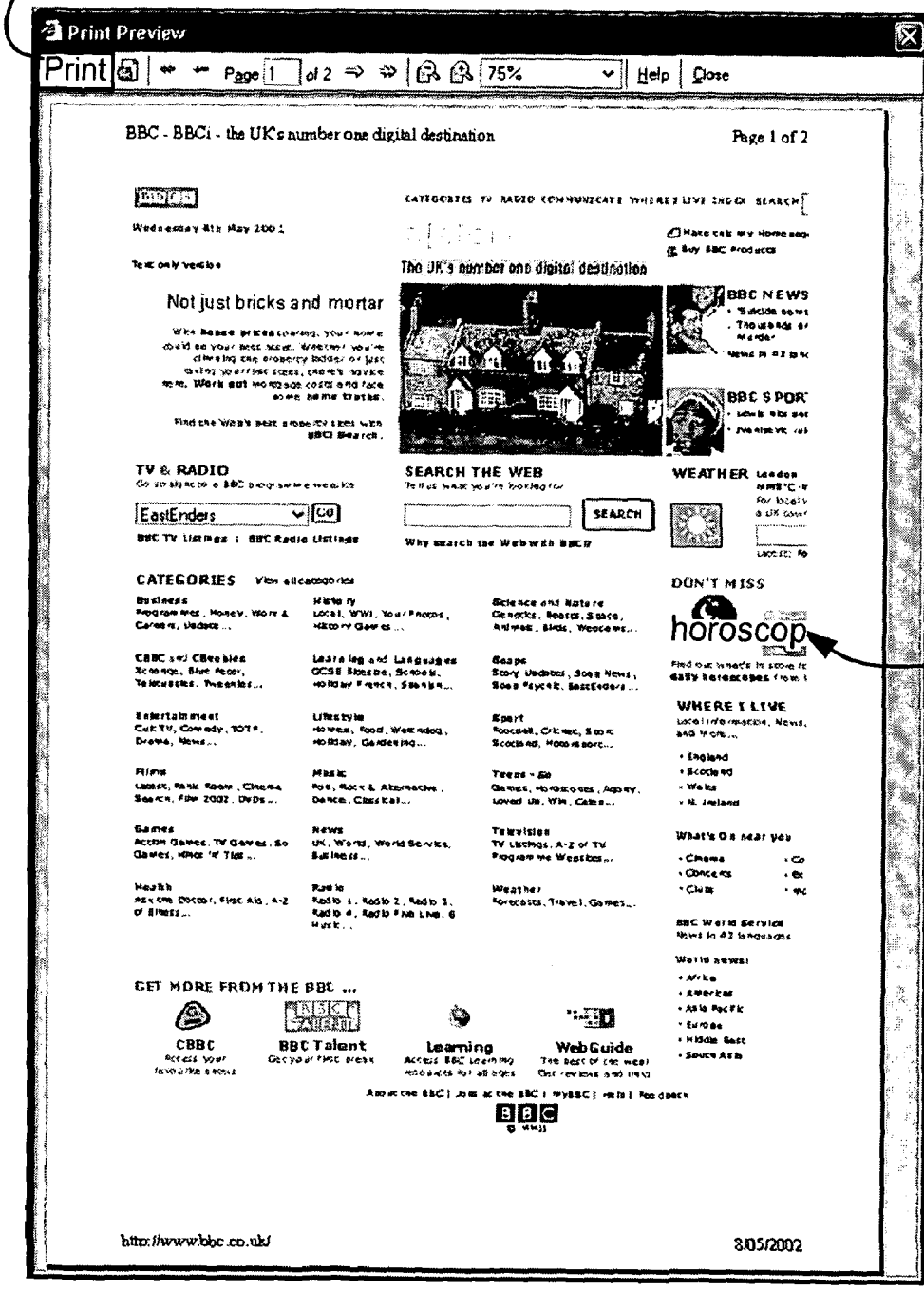
FIG. 2B shows a real example of a prior art print preview similar to FIG. 2A.

A true life example of the clipping seen in FIG. 2A is shown in FIG. 2B which is a print preview performed by Internet Explorer™ version 5.5 (Microsoft Corp.). It is seen in the print preview 250 that the right hand edge 252 has been clipped. This is apparent through the cropping of the word "horoscope" where only the letters "horoscop" are displayed. Actuation of the "print" icon 220 and 254 in the print preview toolbar of FIGS. 2A and 2B respectively will result in the page as displayed being printed upon the printer 2115.

Figure 3:
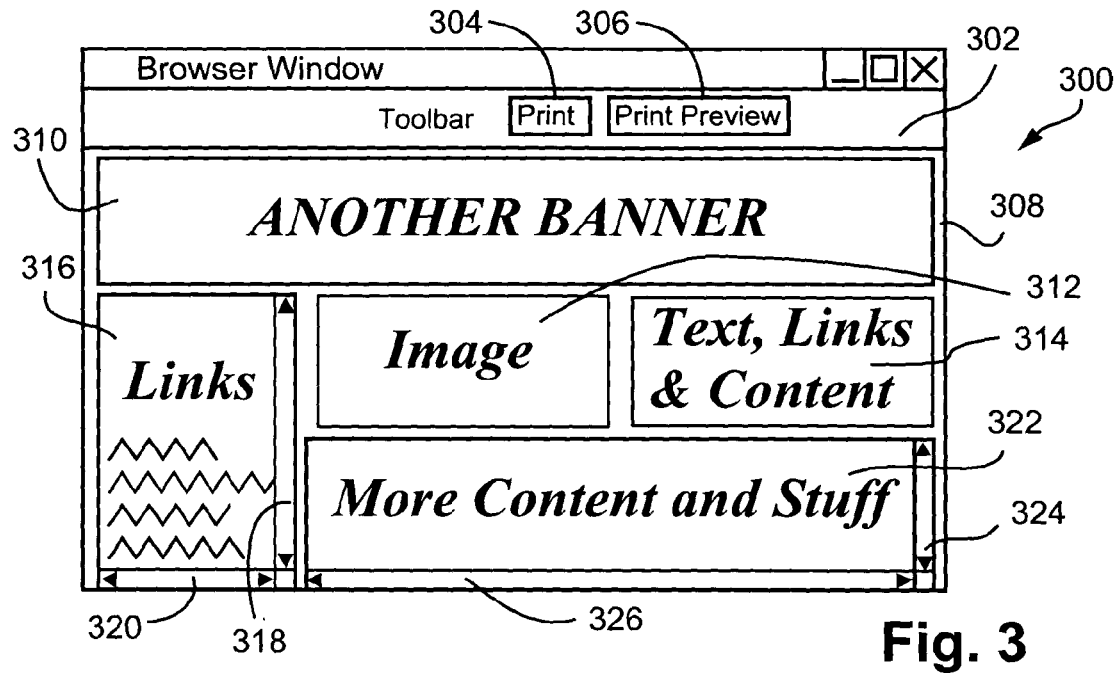
FIG. 3 depicts another typical Web page viewed from a prior art browser window.

FIG. 3 shows another prior art browser window 300 having a toolbar 302 with a print icon 304 and print preview icon 306, and which displays a web page 308. The web page 308 is somewhat more complicated than the web page 104 of FIG. 1 in that each of the content items 310, 312, 314, 316 and 322 are arranged as frames and to be displayed, by virtue of the HTML coding of the web page 308, within the display space afforded by the browser window 300. In this regard, whilst the content items 316 and 322 extend beyond the displayable boundaries, each of those items are provided with vertical 318, 324 and horizontal 320, 326 scroll bars respectively, thereby allowing the user to scroll within those particular content items to view all information contained therein. In this example, the items 312 and 314 collectively form a frame, structured by a table.

A web page such as the web page 308 is termed a "frames page" whereby HTML frames are used to describe and format at least one of the content items contained on the web page 308. Notably, for a typical size of the window 300, the web page 308 is displayed without a scroll bar for the page 308. This is because, for the typical size, each of the frame elements of the page is visible to the user, although individual frames may include corresponding scroll bars. Where the number of frames on such a page is large, or the window size small, a page scroll bar, like the scroll bar 118 of FIG. 1, may appear. Further, as the size of individual frames change, for example by resizing the window 308 or resizing a frame, scroll bars may appear or disappear depending on the extent to which content within the frame is able to be presented in its entirety.

A frames page, in an HTML description, is characterised from a normal page generally by the absence of direct content. A frames page normally contains references to content. For example, an HTML representation of a normal (ie. nonframes) page could be as follows:

```
<HTML>
    text content at the head of the page
    <Image SRC = image.jpg>
    < other content >
</HTML>
```

An HTML representation of a frames page may be as follows:

```
<HTML>
    <FRAMESET ROWS = 100%>
        <FRAME SRC = www.address.com>
    </FRAMESET>
</HTML>
```

Significantly, the frame sourced in the frames page is, in this example, a Web page, for example that of the non-frames page specified above. The <FRAME> item can alternatively be another frame, or a link to another frameset.

Figure 4A:
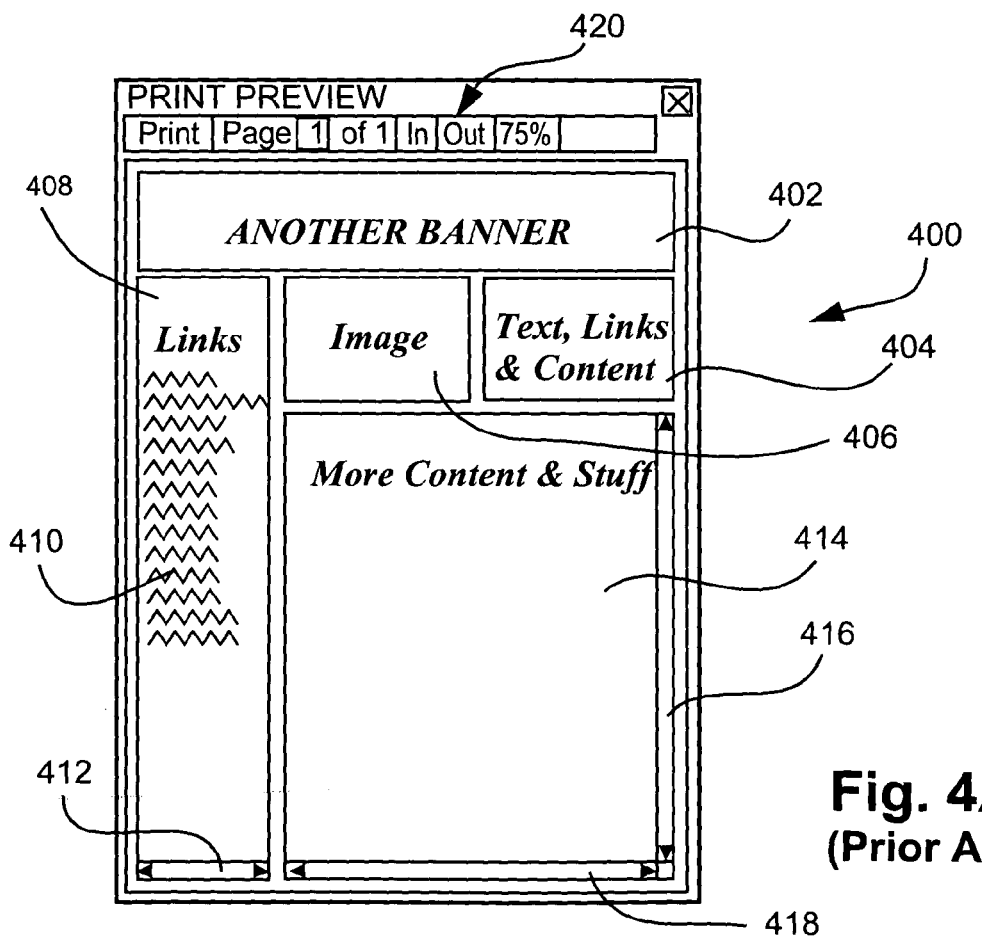
FIG. 4A shows a first prior art print preview of the Web page of FIG. 3.

FIG. 4A shows an example of selecting the print preview icon 306. A print preview 400 results therefrom as seen from FIG. 4A, in which the print preview function does not display the entirety of the web page. As seen from FIG. 4A, the content item 408 has been reproduced in its entire length, and there is no need for inclusion of a vertical scroll bar in that content item. However, since the width of the content 410 within the content item 408 continues to exceed the boundaries of the content item, a horizontal scroll bar 412 is reproduced in the print preview display 400. It will be appreciated that the reproduction of horizontal or vertical scroll bars in a print preview display does not provide a mechanism by which the user may scroll within that print preview display. The print preview display, once created cannot be altered in its content. Only certain levels of magnification may be adjusted as generally provided for in the print preview toolbar, by zoom controls 420. Accordingly, the reproduction in FIG. 4A of the horizontal and vertical scroll bars merely illustrates in that print preview that horizontal and vertical scroll bars would be reproduced if and when printing was actually selected.

As is further apparent from FIG. 4A, because the width of the items exceeds the width of the page, content from a number of the items is cropped and the scroll bars remain.

Figure 4B:
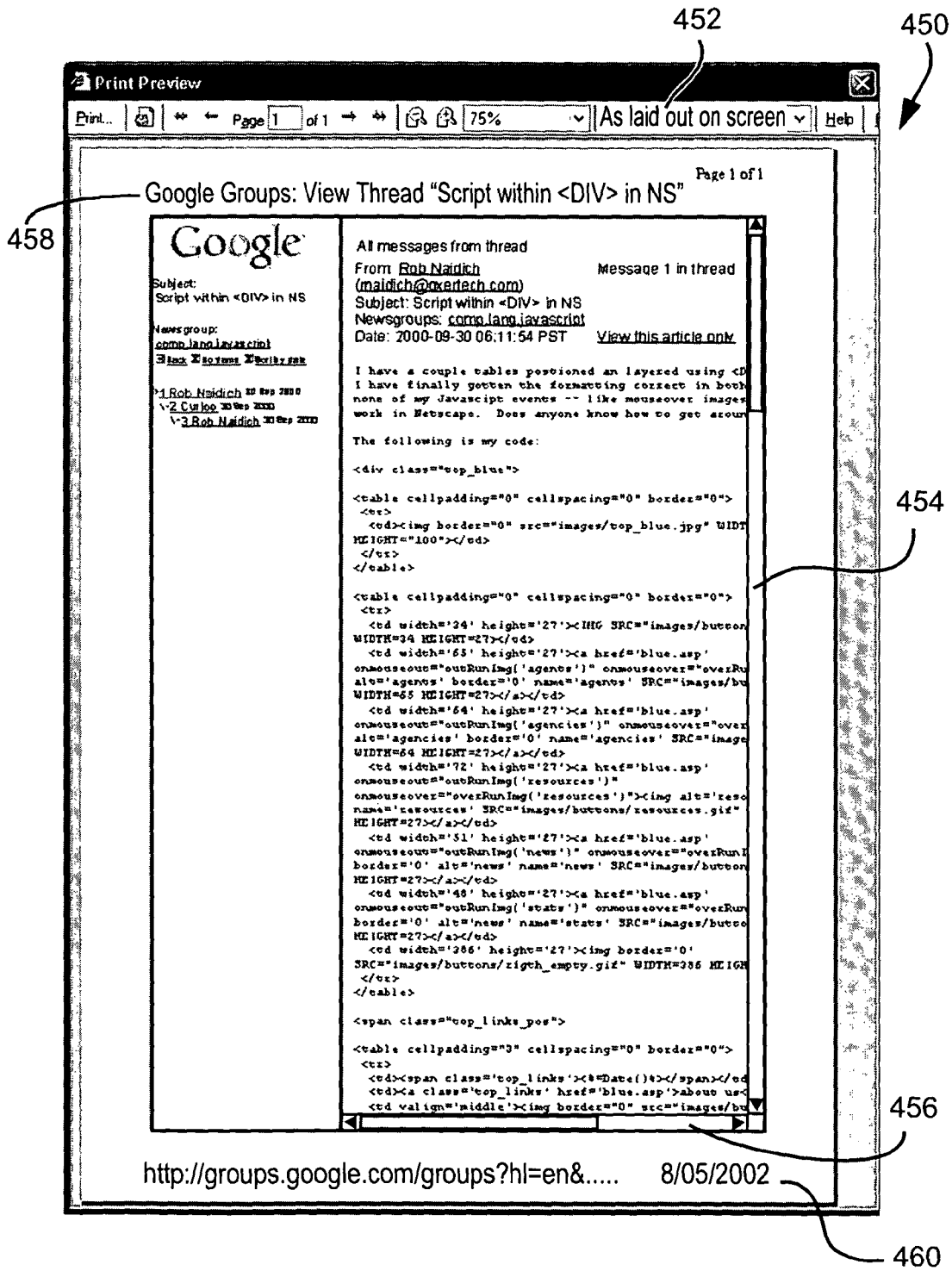
FIG. 4B shows a real example of a prior art print preview similar to FIG. 4A.

FIG. 4B shows a real-life example of the print preview of a frames page using Internet Explorer™6.0. In the print preview 450, the toolbar includes an indication 452 that the print preview be selected by the user to display "as laid out on the screen". This, according to Internet Explorer™6.0 produces a print preview display corresponding to that as seen and utilising the same layout provided on the display screen 2114 to the user. As is apparent, a vertical scroll bar 454 and a horizontal scroll bar 456 are depicted in the print preview. The print preview in this example also includes a header 458 and footer 460 which may be generated by the browsing application (in this case Internet Explorer™6.0).

As will be appreciated from FIGS. 4A and 4B, the display of frames pages using traditional printing techniques contained within known browser applications is unsatisfactory as desired information can be cropped from the display, particularly when presenting frames pages.

Internet Explorer™5.5 and 6.0 include further options for print preview and the consequential printing of frames pages. Two examples of this are shown in FIGS. 5A to 5D. In particular, in addition to the "as laid out on the screen" option described above, Internet Explorer™ 5.5 and 6.0 has a further option to "print all frames individually". User selection of this option causes the browser application to allocate each frame of the web page to at least one corresponding printable page of the hardcopy document to be printed. This is seen in FIGS.

Figures 5A, 5B:
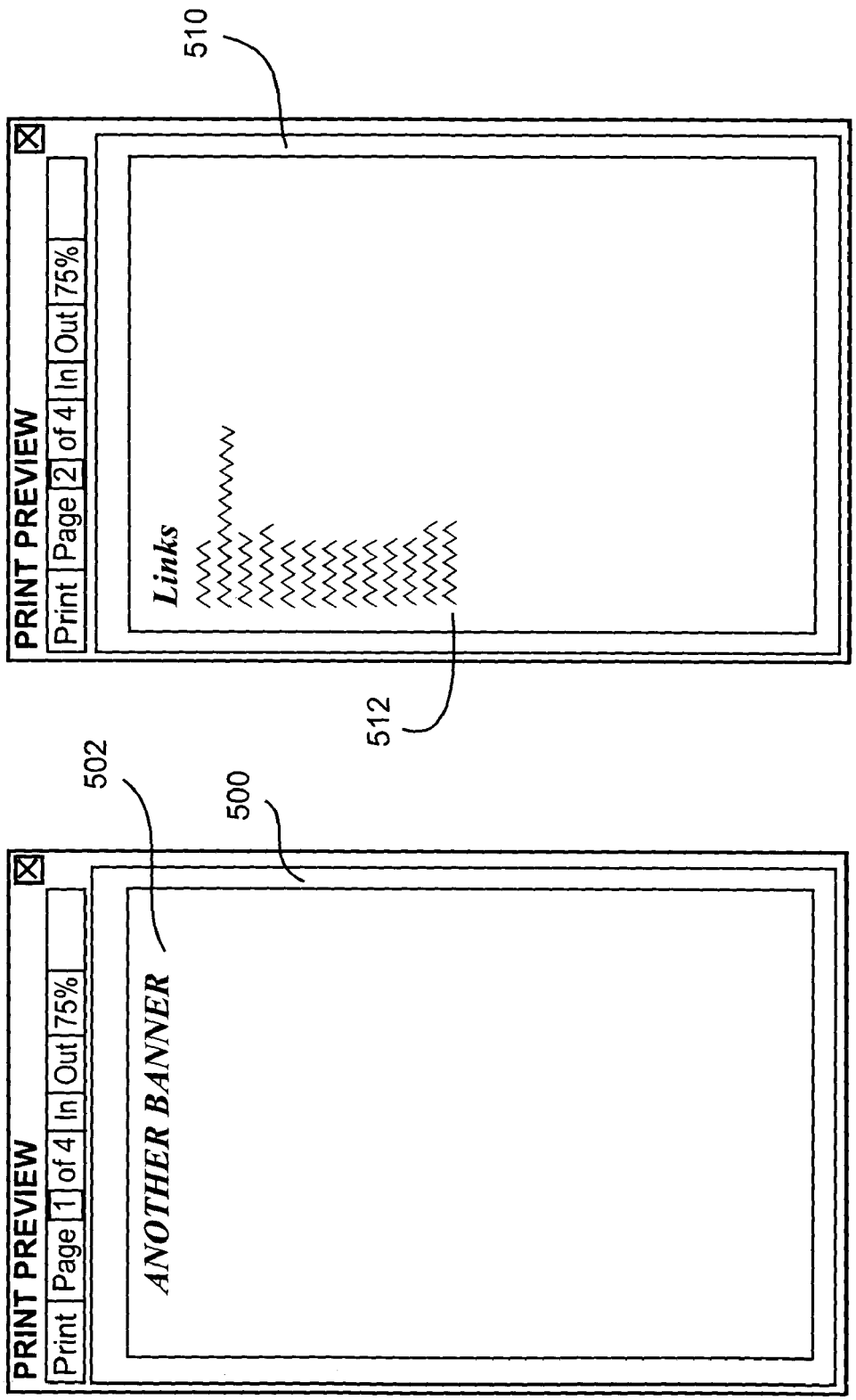
FIGS. 5A to 5D show second and third prior art print previews of the Web page of FIG. 3.
Figure 5D:
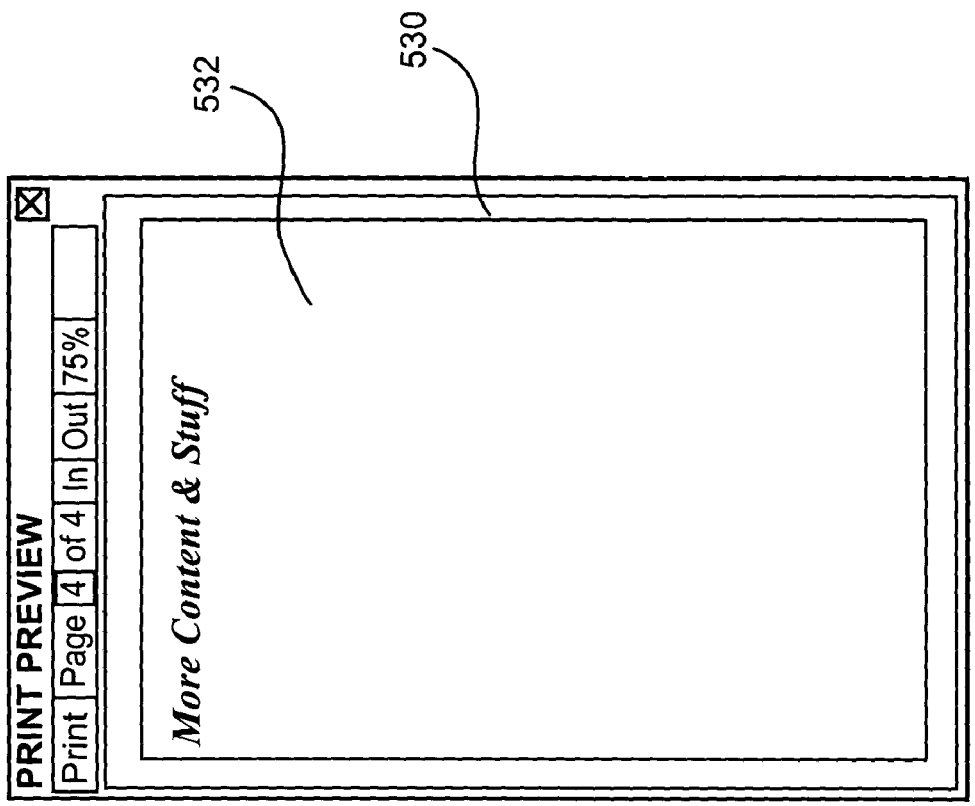
Figure 5C:
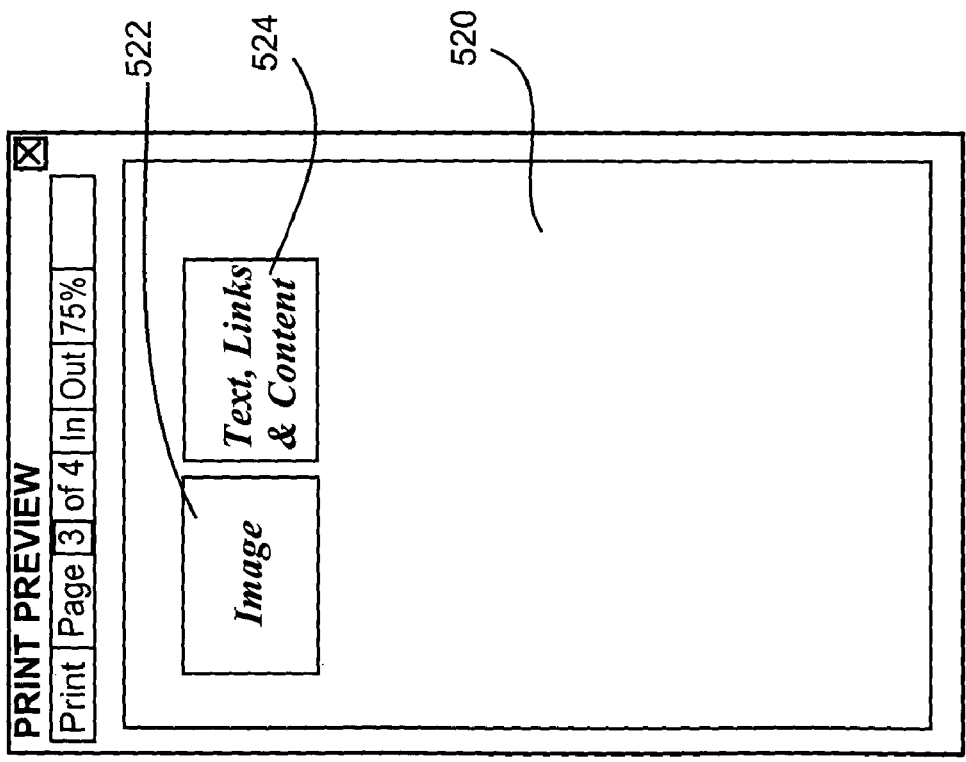

5A to 5D where the web page 308 is identified as having essentially four frames, a first containing the content item 310, a second containing the content item 316, a third containing the content items 312 and 314 (which may be formed as a single table) and a fourth containing the content items 322. FIG. 5A shows a print preview of a first page 500 of such a print job. The first page 500 is seen to include only one item 502 corresponding to the content item 310 of FIG. 3. In FIG. 5B, the second page 510 is shown in which the content item 316 of FIG. 3 is seen as being able to be accommodated in its entirety as is shown by the content 512. It is seen that the links of the content 512 include one substantially long link, which was otherwise obscured in the web page 308 thereby necessitating the horizontal scroll bar 320. The display 512 also includes a number of links that were not shown in the web page 308 without actuation of the vertical scroll bar 318. FIG. 5C shows a third page 520 of the print preview where the two content items 522 and 524 are shown displayed in their tabular form. Like FIG. 5B, as shown in FIG. 5D, the final page 530 of the print preview is able to accommodate the entirety of the final content item 322 (532). Again, horizontal and vertical scroll bars are omitted in this example by virtue of the entirety of the content being able to fit within a single A4 size page.

The third alternative offered by Internet Explorer™5.5 and 6.0 enables the printing of a frame selected by the user. In such an instance, the user need only select one frame of the web page 308, this being performed for example by dragging the mouse 2103 across that portion of content, and then selecting the print preview icon 306. In such an instance, the browser application formats only that frame for printing and a print preview, corresponding to one of the four print previews of FIGS. 5A to 5D, is then provided to the user for review and possible printing.

The three alternatives offered by Microsoft Internet Explorer™5.5 and 6.0 are far from satisfactory in that the first can result in the cropping of desired material, and the second can be expensive in terms of paper and ink. In this regard, it is observed that FIG. 5A and FIG. 5C have little content printed there upon. Selection of the second and third alternatives results in a significant loss of layout and perspective in the user's mind as to the content of the web page 308 as a whole.

The present disclosure proposes a printing application, as noted herein as "custom print", which is preferably implemented as an add-on tool band to a generic browser application, such as Internet Explorer™5.5 or 6.0. An example of this is seen in FIG. 6 that shows part of the Internet Explorer™ GUI 600 which includes a known first tool band 602 corresponding to that which permits access to the Google™ search engine and associated facilities. The further tool band 604, developed as part of the present disclosure, is provided to enable customised printing of web pages and it is observed that the custom print tool band 604 is distinct from the generic print icon 606 contained in the tool bar 608 of the Internet Explorer™ GUI 600. In this regard, selection of the print icon 606 will result in printing according to the arrangements of FIGS. 2A to 5D, whereas a selection of a print icon 610 or a preview icon 612 of the tool band 604 will enable printing in the fashion to be now described and which accommodates frames pages and which substantially faithfully reproduces a layout of the relevant web page.

One feature of the custom print application disclosed herein is automatic scaling to fit web page content onto a printed page. This removes the page-clipping problem described above and seen in FIG. 7 where a print preview 700 of a web page 702 has a width 704 exceeding the width 706 of the print media. To achieve this form of "auto fit", the custom print application examines the web page and records the width of the widest element (eg. 704) in the entire document. The application then records the width of the print media (ie. 706) that the web page will be printed on and determines a print-scaling ratio, if the element width is greater than the page width. The web page document is then reduced by this ratio in order to fit entirely onto the print media. FIG. 8 shows a print preview 800 formed using width scaling where the width of the content is reduced to a width 802 of the media.

Figure 9:
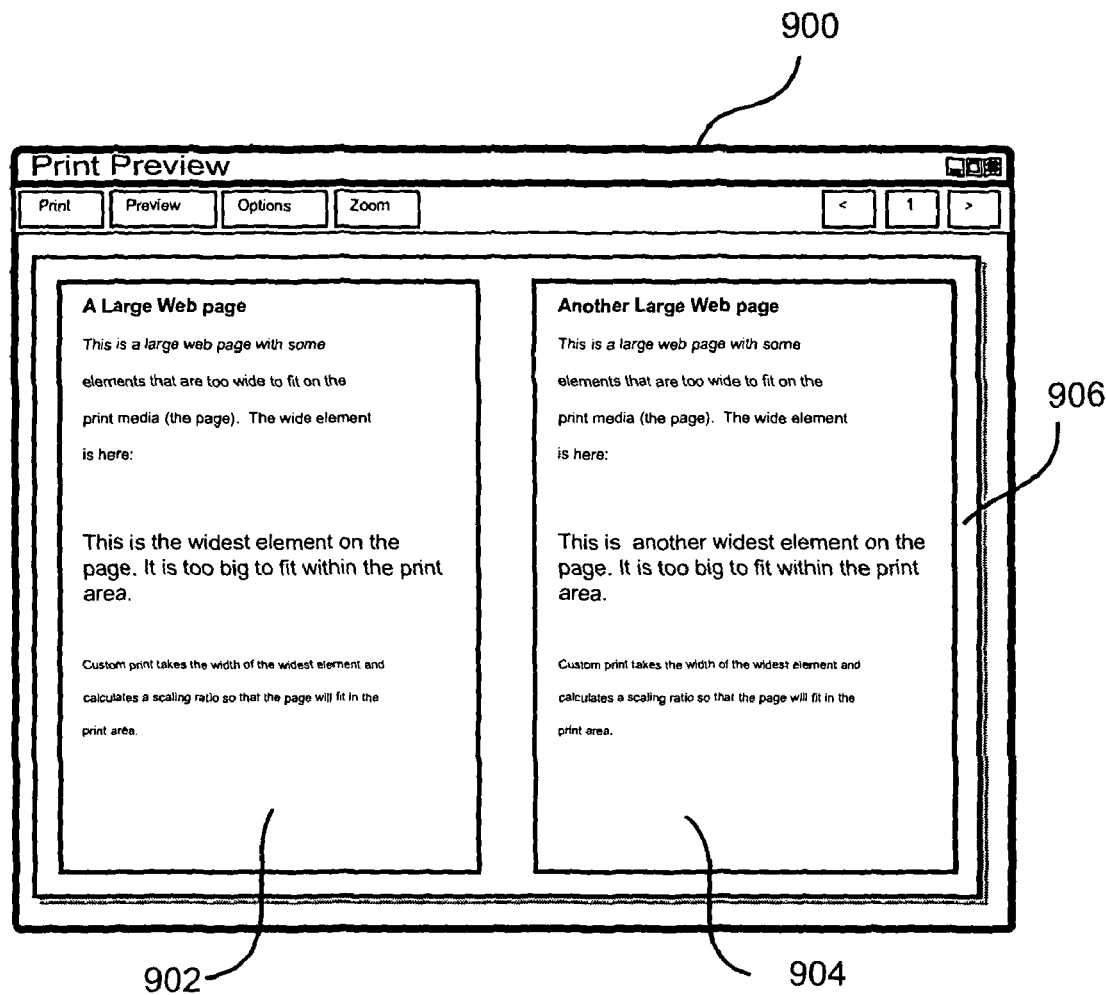
FIG. 9 shows a multi-column approach to achieve compact printing.

The custom printing application is also capable of printing multiple columns of web pages onto a single printed sheet of paper. This allows the user to compress more information onto a single page to make reading easier and to save on paper usage. The user can select up to three columns when printing in either a portrait mode or a landscape mode. FIG. 9 demonstrates multi-column printing with 2 columns on a landscape page. When printing multi-column pages, print scaling as described is applied. However, instead of using the width of the print media to calculate the scaling ratio, the width of the column is used.

Figure 10:
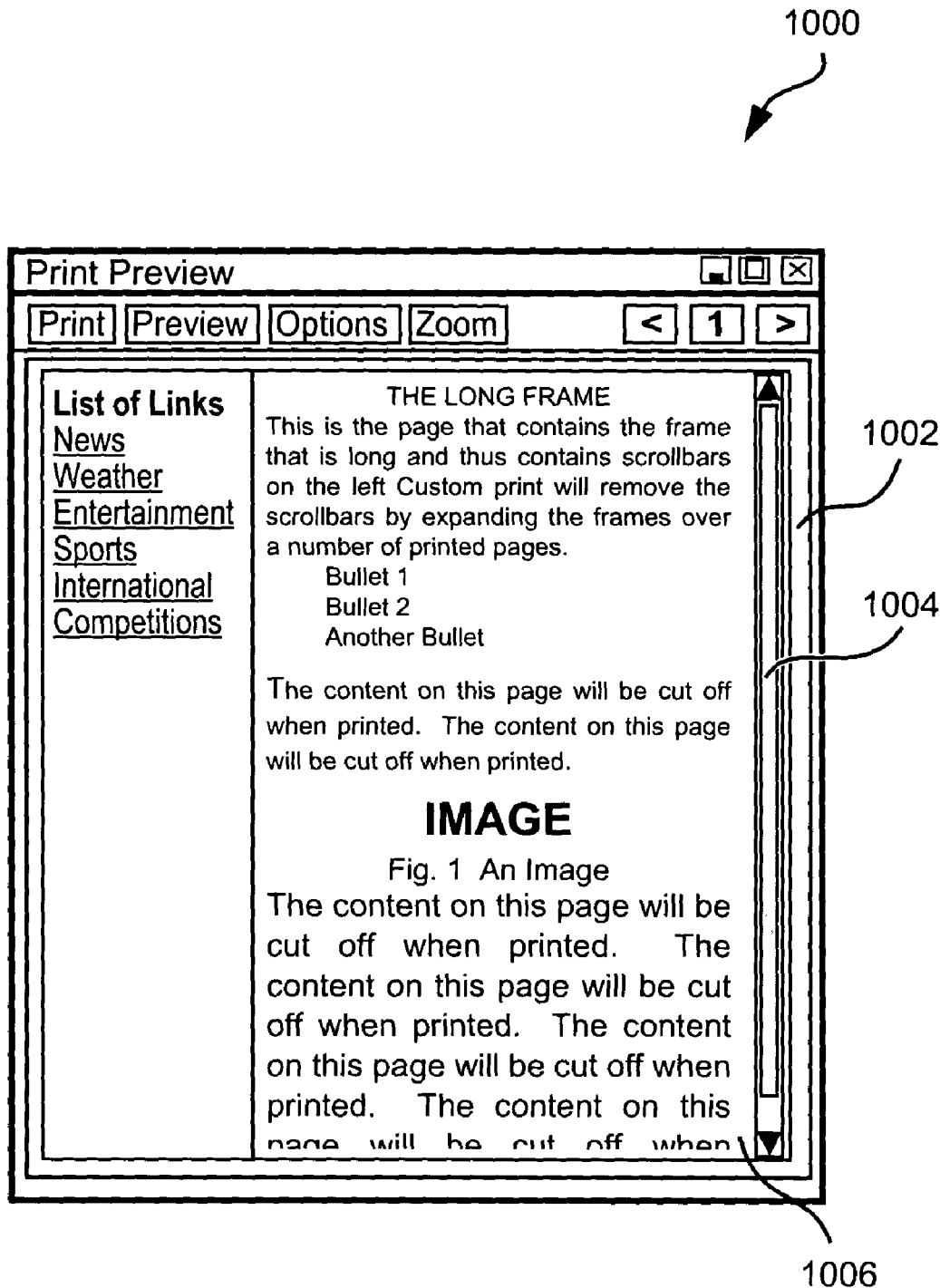
FIG. 10 illustrates a prior art print preview of a long frame page.

The custom print application makes it possible to print framed pages in an optimized fashion. Internet Explorer™ 5.5 and 6.0 currently add scrollbars when printing frame-based web pages that are too long for the print media. An example of this was shown previously in FIG. 4B. The custom print application makes it possible to print these long frames in a coherent fashion. Long frames are expanded over a number of pages and printed in their entirety with the scrollbar removed. This is demonstrated diagrammatically in FIGS. 10 and 11. In FIG. 10, a prior art print preview function (eg. 122 or 306) provides a window 1000 having a page representation 1002. It is noted that the content on the page 1002 is cropped at the bottom 1006 and an inactive scroll bar 1004 is included.

Figure 11:
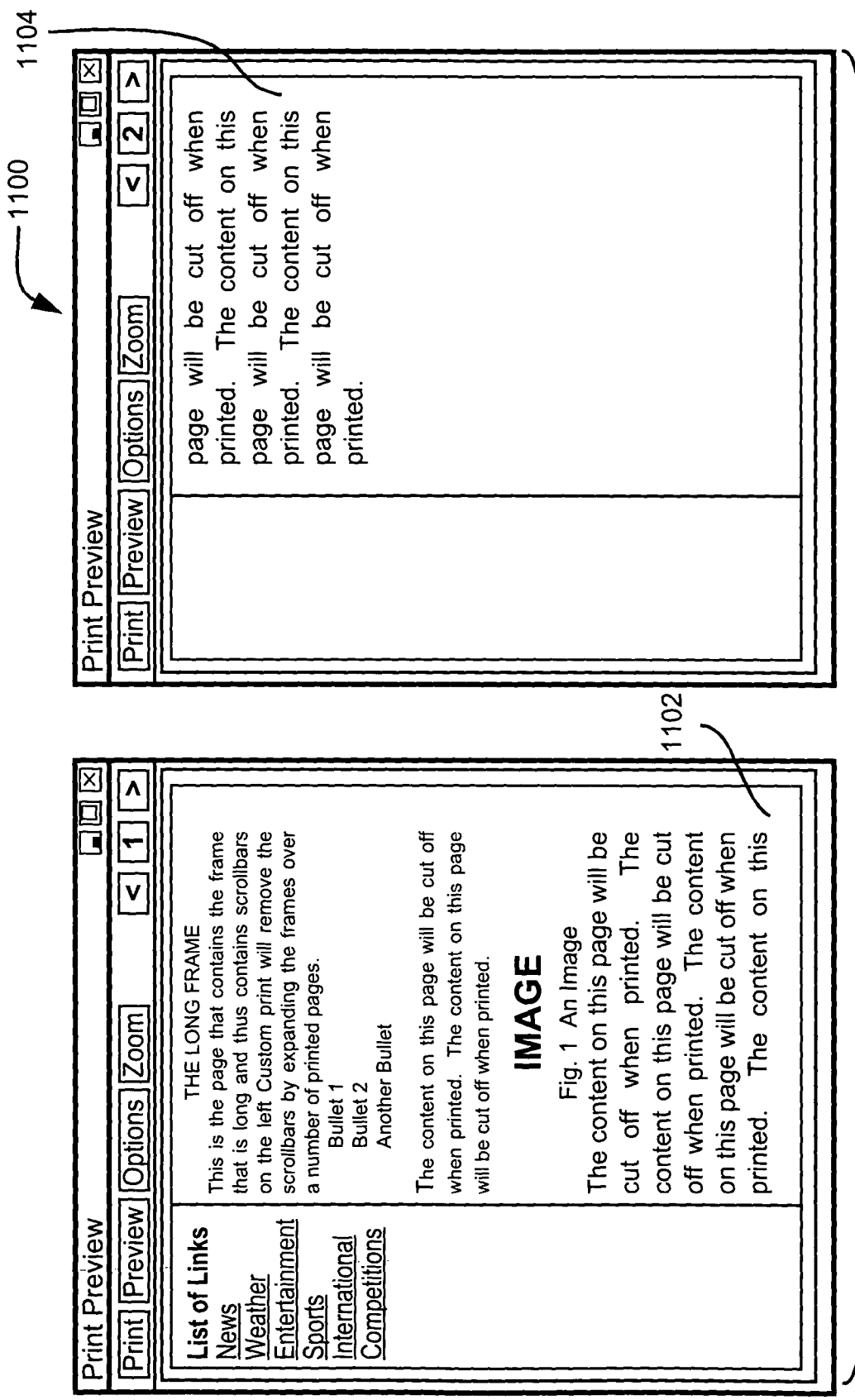
FIG. 11 shows a print preview according the present disclosure of the page of FIG. 10.

Using the print preview function 612 (see FIG. 6) of the custom print application, the same web page is formed into a print preview 1100 of FIG. 11 and which spans two pages as shown thereby showing all the previously cropped content, and no scrollbar. A seen in FIG. 11, the content neatly extends to the bottom 1102 of the first page, and continues to conclusion onto the second page 1104.

Some browsers, such as Internet Explorer™5.5+, provide the capacity for the user to customize how the web browser prints and previews documents. The mechanism for printing and previewing is controlled by print templates, which are HTML files that developers can create using the object model exposed by the print template behaviours. The print template in Internet Explorer™ contains JScript code (a Microsoft version of JavaScript) that is used for manipulating content and accessing objects within the page. The custom print toolband 604 (a C++ application) is the control that issues IDM_PRINT or IDM_PRINTPREVIEW commands, which are commands used within Internet Explorer™, and provides the path to a custom print template. By default, Internet Explorer™ uses its own print template associated with the icon 606.

Figures 12, 13:
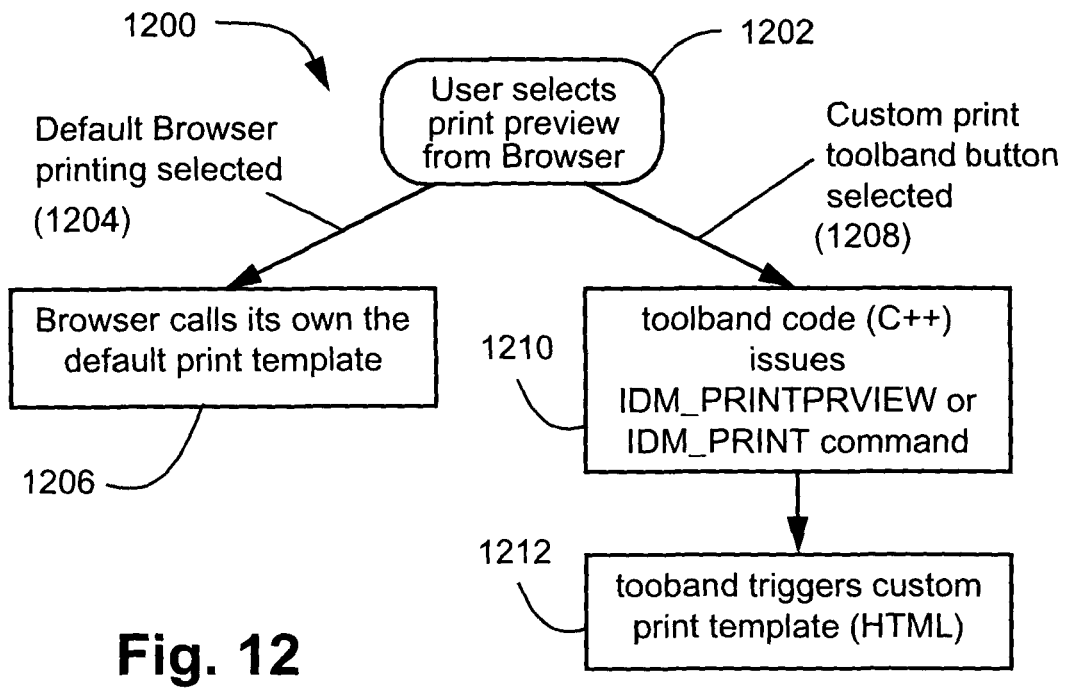
FIG. 12 is a flowchart depicting operation of a browser modified with the toolband of FIG. 6.
FIG. 13 depicts a rectangle approach to the division of a Web page for printing purposes as used in the arrangements of the present disclosure.

FIG. 12 shows a flowchart depicting a method 1200 demonstrating interaction between the custom print application and a host browser application, such as Internet Explorer. At step 1202 the user chooses to select a print preview function from the browser. That selection may be a default print preview selection 1204, which instigates step 1206 whereby the browser calls its own default print template. Alternatively, the user's selection may be one from the custom print toolband 604 as indicated at step 1208 and at step 1210, the toolband code issues commands to the browser application. At step 1212, the toolband triggers the custom print template using HTML code.

By creating print templates it is possible to control:
the layout of pages when printed/previewed, and the content that is printed/previewed on them
how print jobs are handled—for instance, which pages are printed in what order; and the look of the print preview window and controls available on the print preview user interface.

A print template is preferably written using standard HTML, JScript and element behaviours specific to print templates. Four behaviours associated with Internet Explorer™ 5.5+ are:

DEVICERECT
LAYOUTRECT
TEMPLATEPRINTER
HEADERFOOTER.

Element behaviours were added to Internet Explorer from version 5.5 onwards, and provide the ability to add custom elements to web pages. In the following description, the terms element and behaviour may be used interchangeably. These four new element behaviours are used within print templates in the following fashion:

DEVICERECT—A DEVICERECT element represents a page to be printed or viewed in print preview. The number of physical pages printed will correspond to the number of DEVICERECT elements within the print template. The DEVICERECT will have width and height properties that correspond to the width and height of the physical page. These are obtained by querying the TEMPLATEPRINTER element.

LAYOUTRECT—LAYOUTRECT elements define the area or areas (and their styles) on a page where a document's (web page) content is displayed when printed or during print preview. In a print template, LAYOUTRECT elements are contained by the DEVICERECT elements described above. A DEVICERECT can contain more than one LAYOUTRECT. As well as width and height properties, the LAYOUTRECT also has a zoom property that can be used to scale its content. The custom print application uses this for scaling content to fit a page. To add content to a LAYOUTRECT, the contentSrc attribute can be passed a URL string. The page pointed at by the URL will then load or "flow" into the LAYOUTRECT.

TEMPLATEPRINTER—The TEMPLATEPRINTER element provides a number of methods that give a print template control over the start and end of print jobs, control over the printing of each individual page in a print job and control over the display of printing dialog boxes such as the standard Print and Page Setup dialogues. The properties of TEMPLATEPRINTER enable a print template to set or retrieve the page setup settings and current print job settings. For instance, a print template might set or retrieve the page width and page height for page setup, or the start and finish pages to determine the page range to print.

HEADERFOOTER—The HEADERFOOTER behaviour is a conversion tool used by the print template to generate HTML from the header and footer formatting strings defined by the Page Setup dialog box. The element contains properties textHead and textFoot that can be used to insert text headers and footers on the page to be printed.

This often includes information such as the page URL and the page number.

The relationship between some of these elements is demonstrated in FIG. 13 where a print preview 1300 is shown. The print preview 1300 includes a DEVICERECT 1306 which corresponds to a printed page and can contain multiple LAYOUTRECT's. A number of LAYOUTRECT's 1304 are shown and can be positioned within the DEVICERECT 1306 and contained Web page documents. HEADERFOOTER 1302 adds text headers and footers.

It is possible to access the parameters passed to the print preview dialogue window by accessing the dialogArguments object in Internet Explorer™. This object includes the property _IE_BrowseDocument that allows a print template access to the document object for the current web page loaded in Internet Explorer™. It is possible to use this object to access any information in the document including information about framesets and widths and heights of elements.

Optimized scaled printing as described above is implemented via a method that extracts the width of the widest element in the web page to be printed. The width of the widest element of the page is stored in an attribute of the page called the scrollWidth. This value is recorded and used to calculate the scaling ratio for the page. Using the TEMPLATEPRINTER element, the custom print application extracts the width of the print media and then calculates a scaling ratio by which to reduce the document in order to fit it onto the print media. This ratio is then used as the zoom parameter for the LAYOUTRECT into which the document will be loaded. The following pseudo code extract demonstrates how the widest element value is used in conjunction with the print media width to calculate a scaling ratio.

```
// get the width of the widest element
maxWidth = page.scrollWidth;
// get the width of the print media
printMediaWidth = physicalPageWidth − marginWidths
// calculate the scaling ratio
scaleRatio = printMediaWidth/maxWidth
```

The LAYOUTRECT zoom is then set to this scaling ratio and the content (the web page document) will be entirely viewable on the page. It is also necessary to increase the width of the LAYOUTRECT by the inverse of the scaling ratio. This is because when the scaling ratio is applied to the LAYOUTRECT, the content not only gets smaller but so does the LAYOUTRECT. It is therefore necessary to increase the width of the LAYOUTRECT by the same ratio so that the width of the LAYOUTRECT appears not to be scaled.

Figure 24A:
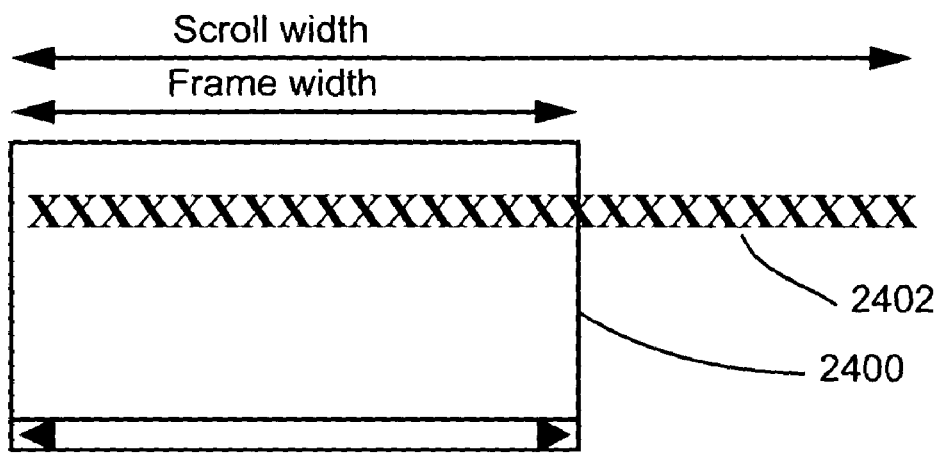
FIGS. 24A to 24C depict a preferred form of scaling used in the described arrangements.
Figure 24B:
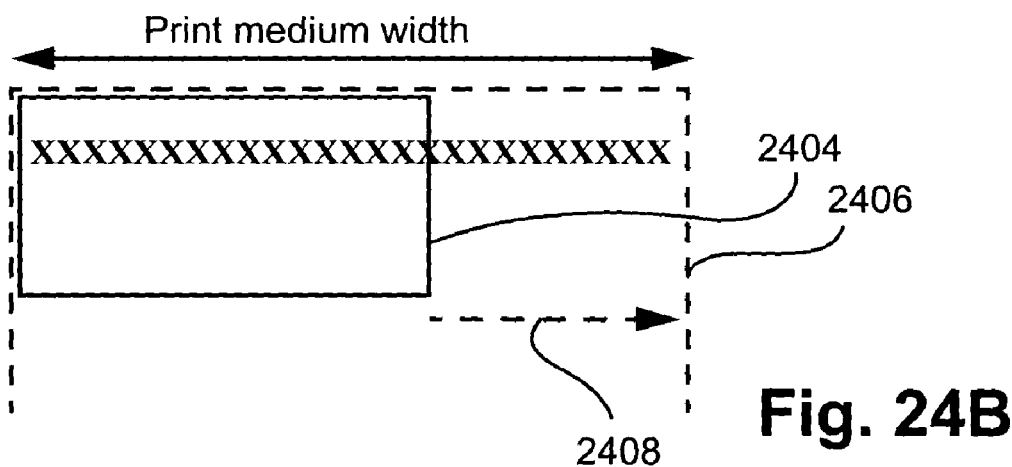
Figure 24C:
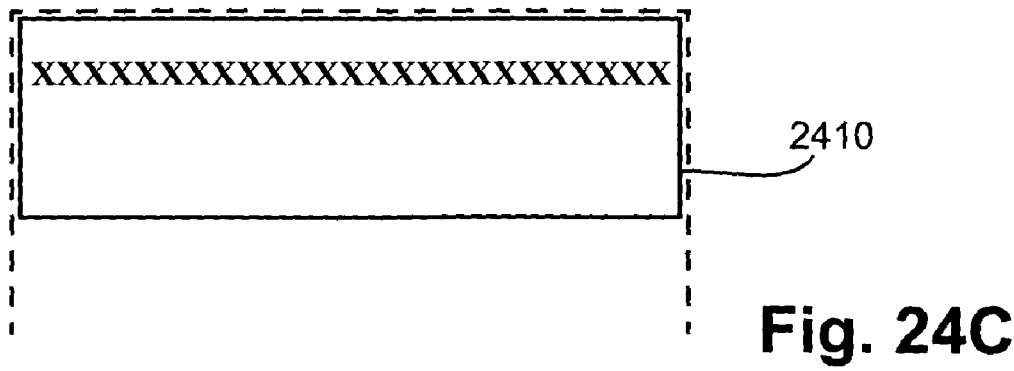

This is seen in the example of FIGS. 24A to 24C. In FIG. 24A, a frame 2400 is shown as would be normally displayed by a browser upon the display 2114. The frame 2400 has a frame width, and a scroll width of content 2402, as indicated. As seen in FIG. 24B, the frame is to be formatted for printing on a print medium 2406 having a width. The scroll width and the print medium width define the ratio to which the frame and its content must be scaled to fit in the width of the print medium 2406. However, at the stage shown in FIG. 24B, once scaled or zoomed to fit, that portion of the content 2402 outside of the frame 2400 would not be visible. It is therefore necessary to expand or zoom the LAYOUTRECT of the frame in FIG. 24B by the width 2408. This is done by scaling the LAYOUTRECT, but not the content 2402 thereof, by the inverse of the previously applied scaling factor. This returns the LAYOUTRECT 2410, as seen in FIG. 24C, to the size of the original frame 2400 where the entirety of the content 2402 is visible on the printable page by virtue of the expanded size 2410 of the LAYOUTRECT.

The competent handling of framed pages increases the complexity of the custom print template. Although, scaling is also provided within framed pages, the issue of "long" frames as introduced above is dealt with in an entirely separate fashion. Having detected the presence of frames, by looking for a <frame> element in the source HTML code, the custom print application then stores information about each of these frames in a recursive data structure. This can be performed by a query upon the Document Object Model (DOM) description, which is a description of the Web page, to identify the number of frame elements. If this number is greater than zero, then a frames page is present and the frames printing process of the custom print application is implemented. This data structure (described later) is recursive because a frame may contain references to other (nested) frames.

The custom print template uses a PT_PrintDocument data structure to represent each page or frame that will be printed.

This structure contains information such as the URL of the page, a unique identifier, the top and left hand positions of the frame, a Boolean to indicate whether or not there are frames in the page and also an array of PT_PrintDocuments to be used when the page contains frames. This data structure is defined in the following code:

```
function PT_PrintDocument(sDocSrc,oDoc,sWidth,sHeight,iUID)
{
    this.pt_UID = iUID;                  // the unique id
    this.pt_DocSrc = sDocSrc;            // the source string
    this.pt_LayoutRectSrc;               // the string identifying the layoutrect
    this.pt_LayoutRect;                  // the layout rect for the doc
    this.pt_LayoutRectSrc;               // the local source of the layoutrect
    this.pt_scrollWidth = sWidth;        // the width of the frame content
    this.pt_scrollHeight = sHeight;      // the height of the frame content
    this.pt_FrameTop;                    // the top position of the frame
    this.pt_FrameLeft;                   // the left position of the frame
    this.pt_FrameHeight;                 // the height of the frame
    this.pt_FrameWidth;                  // the width of the frame
    this.pt_Dependencies = new Array( ); // array of rect IDs which are
                                         //   above this
    this.pt_ChildFrames = new Array( );  // an array pointing to the child
                                         //   frames
}
```

Internet Explorer™ for example, stores a local copy of the content of each frame whenever it encounters a framed page. This allows the browser to access the content quickly if the user requests viewing of individual frames. The custom print application stores the path of these local copies within the PT_PrintDocument data structure as well as storing other information about the frames such as their width, height and position. This information is all obtained by accessing the attributes of the frame on the original page. As each PT_PrintDocument structure is created, a copy is also stored in a linear array, thus removing the tree structure of the nested frames. This is demonstrated in FIG. 14. Using this linear array makes iterating through all of the frames more simple than traversing the original tree structure. As seen in FIG. 14, the document structure is shown as a tree structure 1400 having a primary frame 1404, from which depends the three secondary frames 1406, 1408 and 1410. Depending from the secondary frame 1410, are two tertiary frames 1412 and 1414. This tree structure is copied and stored in a linear array 1402. This may be performed in other ways, one example of which is by traversing the tree. The ordering of the frame records in the linear array is not significant, as each record includes a link to the frame from which it depends. Reading of the array commences by finding that record that does not depend from any other record.

As well as recording the height of the frame as viewed on the page, the height of the content within the frame (the scrollHeight) is also recorded by the custom print application. If the scrollHeight is larger than the height of the frame, then the frame will contain a vertical scrollbar when it appears in the web browser to enable the user to scroll and view the rest of the content.

This is shown in FIG. 15 where content 1500, contained within a web page, includes a visible portion contained within a frame 1510 having a height 1504. The frame is scrollable using a scroll bar 1502 to access the remaining content of the frame. The actual scrollHeight necessary to view the remaining content 1506 is depicted by an arrow 1508. The custom print application uses the scrollHeight of the frame rather than the frame height to create the printout of the document so that the scrollbars are removed and all the content can be seen.

Increasing the size of the frames by using the scrollHeight means that some of the frames may overlap each other. This is seen in FIGS. 16 and 17 where FIG. 16 shows an original page 1600 having a frame 1602 and an associated scrollbar 1604.

FIG. 17 shows the same page, now designated 1700 which includes the previously visible portion of the frame, now designated 1702 and an expanded portion 1704 that now overlaps the underlying frame of the page. A simple test can be carried out to see if this is the case. Once all of the frame information has been recursively stored, a function is called that checks each of the frames and records if any of the other frames appear higher up on the page. The unique IDs of these frames are stored in an array called pt_Dependencies. Each PT_PrintDocument structure, and therefore each frame, has such an array and thus knows which frames appear above it on the page. These dependencies are used when the frames are drawn on the page to be printed. Only frames that have had all their dependencies drawn already can be drawn on the page (ie. the topmost frame will always be drawn first).

The removal of vertical scrollbars has already been explained by the process of expanding long frames. Horizontal scrollbars are removed in a different fashion. In this case, instead of expanding the frame to fit the content, the content is scaled to fit the frame. The scrollWidth was recorded when the frames were recursively stored. This is now compared to the frame width (this.pt$_{13}$FrameWidth) and an appropriate scaling factor is calculated. The scaling factor is then applied to the content of the frame so that all the content can be seen. Each frame will have its own independent scaling ratio so that each is scaled to fit its particular content. It is noted that although the frame at this stage has been altered from its original form, it is still a frame, although not one within the original frameset (ie. the original LAYOUTRECT). The disclosed arrangement creates its own LAYOUTRECT for each frame, and inserts the content of the frame into the created LAYOUTRECT.

The scaling ratio for each frame may be calculated using pseudo-code as follows:
// calculate the scaling ratio scaleRatio=this.pt_FrameWidth/this.pt_ScrollWidth Each frame is drawn ready for printing once all of the frames that it is dependent on (ie. frames that were above it on the original web page) have been drawn. Therefore the topmost frame, which will not be dependent on any other frames is always drawn first. Before a frame is drawn, a check for any overlaps is performed by comparing the top of the frame with the bottom of the all of the frames that it is dependent on. If there is an overlap, then the frame is shifted down to remove the overlap. A LAYOUTRECT is drawn on the page to correspond to the position where the frame was in the original page (except that it may have been pushed down) and the frames content is placed in the LAYOUTRECT. The LAY- OUTRECT is positioned based on the this.pt_FrameTop and this.pt_FrameLeft values that were recorded earlier. If a frame overlaps the bottom of the page the custom print dynamically creates new pages to handle this overlap and to thereby display the remaining content.

When an overflow occurs (ie. content going over a page), new pages (ie. DEVICERECTS) are created to house the extra content. A simple check is performed to see if a frame goes beyond the bottom of the page. This is done by comparing the bottom of the frame with the bottom of the page. If there is an overlap, then a new LAYOUTRECT is created on the new page so that the rest of the frame content can be displayed. This process continues until all of the frame content has been displayed. FIGS. 18A-18D demonstrates the process of dealing with long frames and creating new pages.

Using the custom print application as described, the printing functionality of generic browsing applications may be readily adapted to faithfully accommodate and allow for the quality user interpretation of printed web pages containing frames.

Preferably, the custom print application may be downloaded via the Internet to the user's computer 2101 in the form of an application program that automatically attaches itself to the generic browser application. In this fashion, the user interface of the custom print application (ie. the toolband 604 in FIG. 6) may be automatically reproduced with the generic browser application at initialisation.

Figure 20:
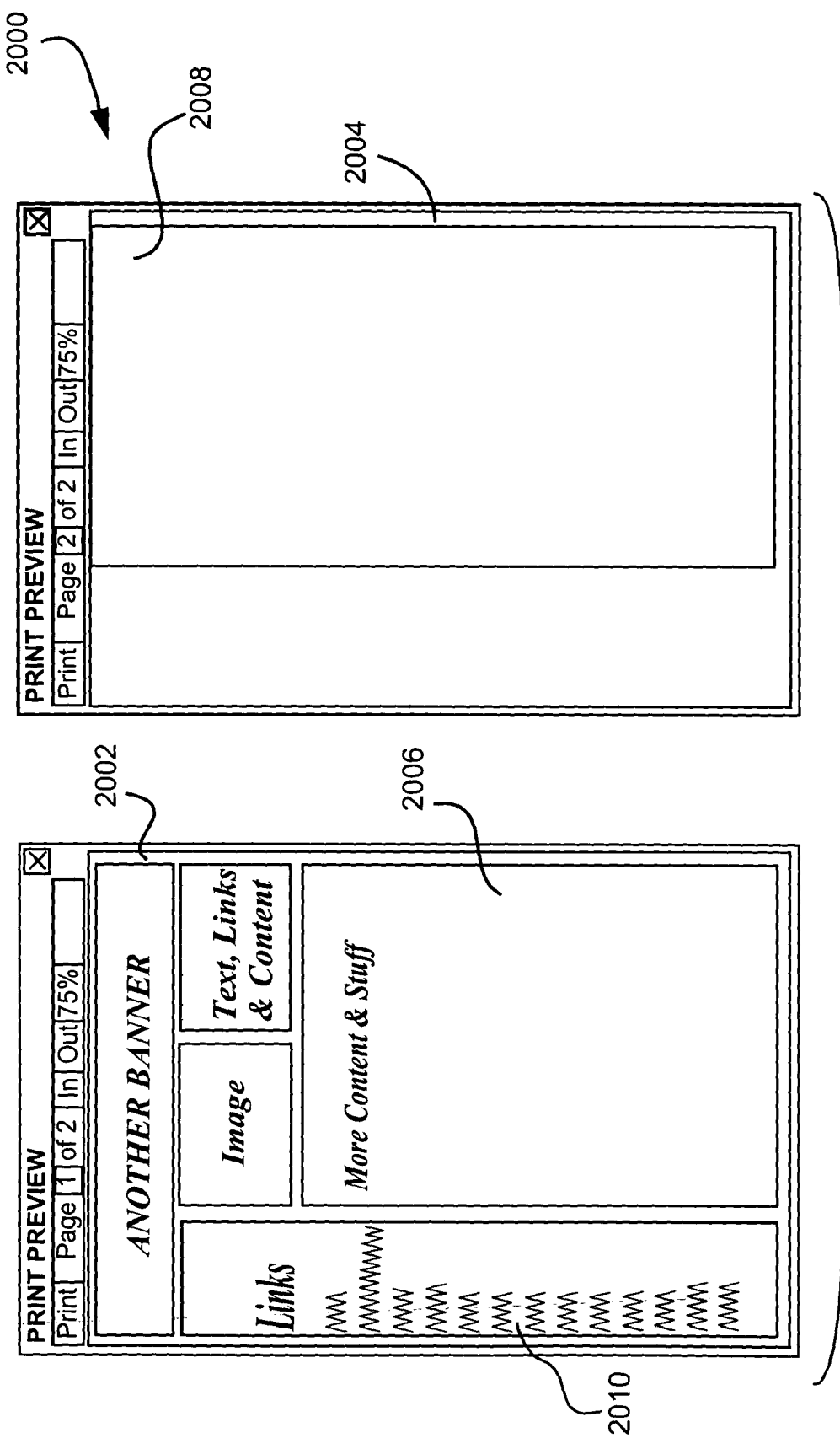
FIG. 20 shows a print preview of the frames page of FIG. 3 according to the present disclosure.

Returning to the exemplary web page 308 shown in FIG. 3, FIG. 20 depicts a print preview representation 2000 of the same web page according to that produced by the custom print application. As can be seen, width scaling has occurred in respect of the links content 2010 on a first page 2002. Further, "More Content & Stuff" is shown as an item 2006 on the first page 2002 and as a continuation 2008 on the second page 2004. In this fashion, the entire content of the original web page is reproduced and visible in the printable document contained by the print preview 2000 and the same layout is retained as that seen by the user on the display screen 2114. This significantly contrasts with the representations contained in FIGS. 4A and 4B and FIGS. 5A to 5D.

Figure 18A:
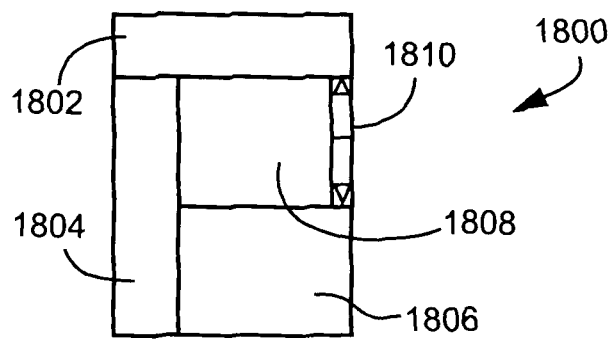
FIGS. 18A to 18D illustrate a method of handling long frames according to the present disclosure.
Figure 18B:
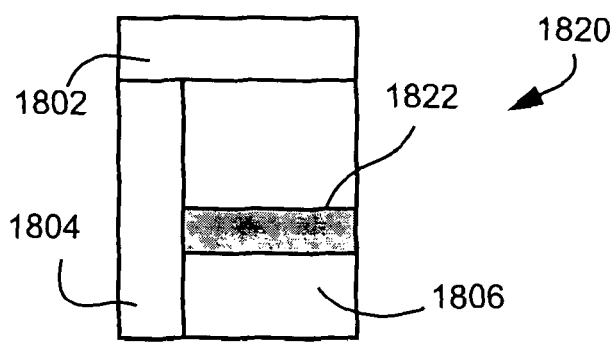

As seen in FIG. 18A, an original web page 1800 comprises content items 1802, 1804, 1806 and a frame content item 1808. The frame 1808 includes an associated scrollbar 1810. At this stage, the custom print application stores and measures-all of the frames on the original page 1800. It is observed that the frame 1802 is dependent on no other frame, whereas frames 1804 and 1808 are each dependent on frame 1802. Frame 1806 is dependent on both frames 1808 and 1802. As shown in FIG. 18B, the custom print application uses scrollHeight and scrollWidth to re-size any long frames, which are always expanded downwards. This is seen whereby the frame 1808 is expanded by the portion 1822 thereby removing the scrollbar 1810. It is seen that the expanded portion 1822 overlaps the content item 1806.

Figure 18C:
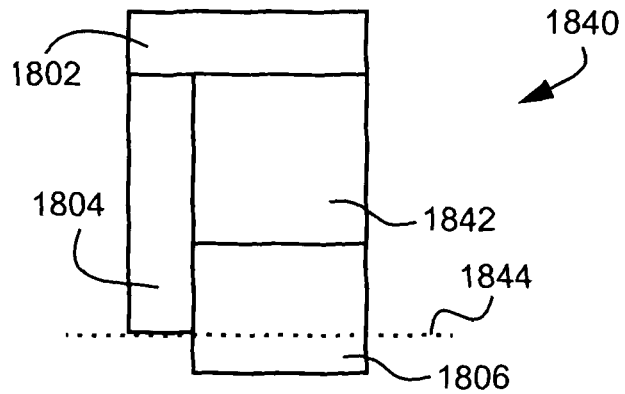
Figure 18D:
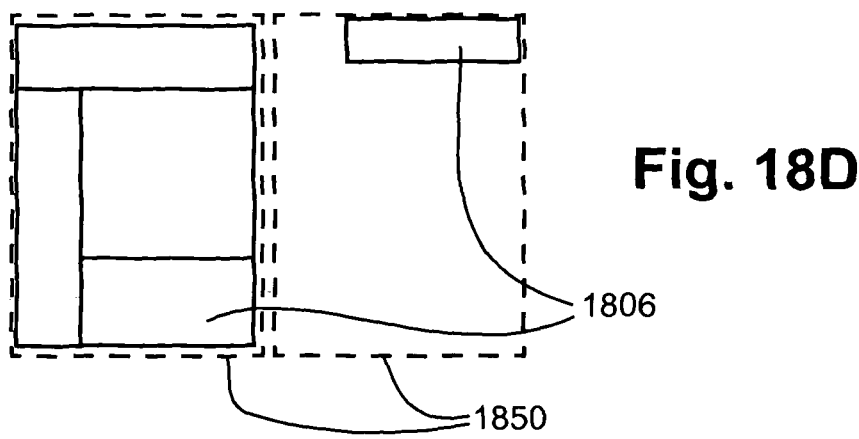

The third stage of the process is shown in FIG. 18C where a check for any overlaps between frames is performed. If there are any overlaps, then the lower frame is shifted downwards. This is seen whereby the original frame 1808 has been shifted to form a frame 1842 in the representation 1840 and at the frame 1806 is expanded over a page break 1844. If any of the LAYOUTRECTS overlap, the page then stores their sizes and dynamically creates a new page defined by the break 1844. The result of this process is seen in FIG. 18D where two printable pages 1850 are formed and the content of the frame 1806 is extended from the first to the second page 1850.

In the preferred implementation, frames have horizontal scrollbars, such as depicted in FIGS. 23A and 23B. Depicted in FIG. 23A, a frames page 2300 is shown within a browser window, including a frame 2302, the entirety of which can be seen, and two pairs of side-by-side arranged frames 2306 and 2304, and 2312 and 2314 respectively. The frame 2306 has a horizontal scroll bar 2310 to enable content 2308 to be viewed. FIG. 23B shows the result of extending the frames vertically to remove the vertical scroll bars according to the approach of FIGS. 18A to 18D. Two printable pages 2350 are created with the frame 2304 resulting in overflow across the page break and realised by portions 2356 and 2358. The frame 2312 is scaled horizontally and shifted and extended vertically to become portion 2360, as seen in FIG. 23B. Further, the frame 2314 is shifted and extended vertically to become portion 2362.

Figure 22:
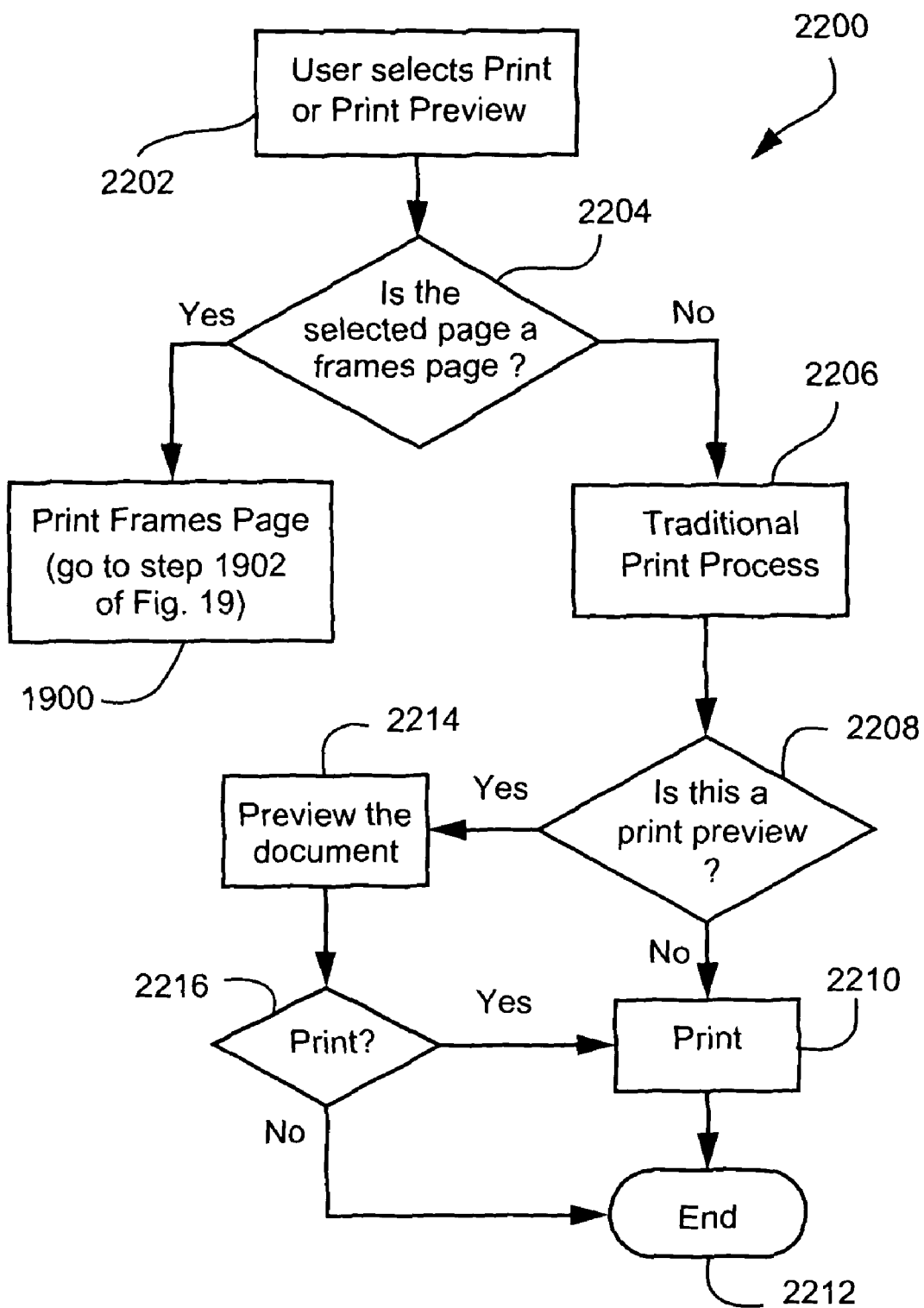
FIG. 22 is a flowchart for the printing of Web pages incorporating the described arrangements.

The various approaches to the handling of frames pages for printing can be combined into a general printing method 2200 as depicted in FIG. 22. In the method 2200, the user selects Print 610 or Print Preview 612 from the toolband 604 and the custom print application initially determines at step 2204 whether or not a frames page is to be printed. This can be done by examining the HTML for a <FRAME> definition. Where such is not present, a non-frames page is determined and step 2206 follows to implement a traditional printing process. This includes step 2208 which determines whether Print Preview 612 was selected, in which case the printable representation of the web page is presented on the display 2114 to the user. At step 2216, the application awaits detect of the user selecting printing, in which case step 2210 follows and the previewed representation is printed and the process ends at step 2212. If, at step 2208, Print 610 was determined, printing step 2210 follows directly. Where step 2204 detects the presence of a frames page, a method 1900 of FIG. 19 is implemented.

The overall method performed by the custom print application for frames pages is summarised by the method 1900. An entry point 1902 to the method 1900 follows the selection of either one of the print preview icon 612 or print icon 610. In the first process step 1904, the method 1900 recursively stores and measures the frames of the web page. This can also include assessment of the width of the target print medium as discussed for example with reference to FIGS. 7 and 8. This step also emulates the creation of the linear array 1402 of FIG. 14. In a next step 1906, the application builds a linear array of dependencies for each frame, this being a record of which frames are above which other frames on the page. Step 1908 follows which obtains a particular frame to draw. Step 1910 then determines whether or not all higher dependency frames, if any, have already been drawn. If not, steps 1908 and 1910 are repeated to identify from the linear array an undrawn frame for which all dependency frames have been drawn. When such a frame is identified, step 1912 then checks for overlap with the dependencies and shifts the frame downward where an overlap exists. Step 1914 then draws the particular frame and step 1916 dynamically creates a new page and LAYOUTRECT if required. Step 1920 then checks if there are any more frames in the linear array that are yet to be drawn. If so, control returns to step 1908. When all frames are drawn, an arrangement such as that shown in FIG. 18D will exist. The method 1900 then performs steps 1922 to 1926 which correspond in function to the steps 2208 to 2212 described above.

The custom print application makes it possible to print multiple web pages on a single printed page as described above with respect to multicolumn printing. This is achieved by adding a second LAYOUTRECT onto the DEVICERECT. Scaling can also be applied within the new columns but the scaling ratio calculation has to be updated. The print media width will now be calculated as the width of the physical page minus the margins and the gap between the columns. The total width of the column gaps is the column gap multiplied by the number of columns minus 1. The width is also divided by the number of columns so that multiple columns can fit on a single page. This may be described by the following pseudo code:

```
// get the width of the print media
printMediaWidth = (physicalPageWidth - marginWidths -
                   (columnGap* (NumColumns-1))/NumColumns
```

Frame printing is also supported when printing multiple columns but calculations of resizing and positioning are performed relative each of the LAYOUTRECTs within the DEVICERECT.

INDUSTRIAL APPLICABILITY

It is apparent from the above that the arrangements described are applicable to the computer and data processing industries and particularly as a component or subsidiary to a browser application program.

The foregoing describes only some embodiments of the present invention, and modifications and/or changes can be made thereto without departing from the scope and spirit of the invention, the embodiments being illustrative and not restrictive.

The invention claimed is:

1. A computer-implemented method of forming a printable representation of a web page document having content in at least two frames, the computer including a processor, a memory and a display device each coupled to the processor, the web page document being displayed by the processor upon the display to represent the content in the at least two frames, said method comprising the steps of:
   (a) recording in the memory a position, height and width of each frame of the at least two frames of said web page document in a display window of the display device in which said web page document is presented;
   (b) identifying using the processor dimensions of a printing medium associated with said printable representation;
   (c) determining using the processor a height of the content of in each frame of said at least two frames;
   (d) determining using the processor, for each frame of said at least two frames, a record of any corresponding dependency frames, each said dependency frame being above a respective frame of said at least two frames in said display window;
   (e) interpreting using the processor the records to establish a display order of said at least two frames;
   (f) for each frame of said at least two frames, and in said display order, using the processor to:
      (fa) check a start position of said each frame of said at least two frames against an end position of a created display region of a frame upon which said each frame of said at least two frames is dependent, and setting said start position to be said end position;
      (fb) create a display region upon a page in said printable representation at said start position according to said corresponding content height;
      (fc) place the content of said each frame of said at least two frames into said display region; and
      (fd) where said display region exceeds a page limit in said printable representation, terminate the display region at the page limit and create a further display region upon a following page of the printable representation so as to span the content of said each frame of said at least two frames across the display region and the further display region; and
   (g) one of store the printable representation in the memory and transmit the printable representation to a printer for printing.

2. A method according to claim 1 wherein step (c) comprises:
   (ca) determining a width of said content of each frame of said at least two frames;
   (cb) determining a scaling factor by which the content width of said each frame of said at least two frames need be adjusted to correspond to a corresponding display width of said each frame of said at least two frames in said display window; and
   step (fb) further comprises scaling the content of said each frame of said at least two frames according to said scaling factor to fit within said display width.

3. A method according to claim 2 wherein step (fb) comprises:
   (i) applying a zoom to the display region corresponding to the scaling factor; and
   (ii) expanding a width of the display region by the inverse of the scaling factor to thereby reveal content otherwise obscured.

4. A method according to claim 1 wherein step (b) comprises reducing said dimensions by margin dimensions to be formed in said printable representation.

5. A method according to claim 1 wherein step (d) comprises forming a linear array of records incorporating links from records of dependent ones of said at least two frames to frames from which they depend.

6. A method according to claim 1 wherein no account is taken of horizontal dependency between said at least two frames.

7. A method according to claim 1 wherein said printable representation is a print preview representation.

8. A method according to claim 1 wherein said printable representation comprises at least part of a print job dispatched to a printer.

9. A method according to claim 1 wherein said web page document comprises an HTML document defining a Web page.

10. A computer-implemented method of forming a printable representation of a Web page, the computer including a processor, a memory and a display device each coupled to the processor, the Web page being displayed by the processor upon the display to represent content in at least two frames, said method comprising:
   (i) detecting using the processor one of a print or a print preview selection for said Web page from a Web browser application executing on the computer;
   (ii) examining using the processor a definition of said Web page for the presence of frames; and
   (iii) where step (ii) detects the presence of said at least two frames in said Web page, forming using the processor a printable representation of the Web page, said forming comprising the steps of:
      (a) recording in the memory the position, height and width of each frame of said at least two frames of said Web page in a display window of the browser application in which said Web page is presented on the display device,
      (b) identifying dimensions of a printing medium associated with said printable representation;
      (c) determining a height of the content in of each said frame of said at least two frames;
      (d) determining, for each said frame of said at least two frames, a record in any corresponding dependency frames, each said dependency frame being above a respective frame of said at least two frames in said display window;
      (e) interpreting the records to establish a display order of said at least two frames;
      (f) for each frame of said at least two frames, and in said display order:

(fa) checking a start position of said each frame of said at least two frames against an end position of a created display region of a frame upon which said each frame of said at least two frames is dependent, and setting said start position to be said end position;

(fb) creating a display region upon a page in said printable representation at said start position according to said corresponding content height;

(fc) placing the content of said each frame of said at least two frames into said display region; and (fd) where said display region exceeds a page limit in said printable representation, terminating the display region at the page limit and creating a further display region upon a following page of the printable representation so as to span the content of said each frame of said at least two frames across the display region and the further display region.

11. A method according to claim 10, further comprising the step of:

(iv) where step (ii) fails to detect the presence of a frame, forming the printable representation according to the browser application.

12. A non-transitory computer-readable storage medium having a computer program recorded thereon, the program being arranged to make a computer execute a procedure to form a printable representation of a web page document having content in at least two frames, said program comprising:

code means for recording the position, height and width of each frame of said at least two frames of said web page document in a display window in which said web page document is presented, code means for identifying dimensions of a printing medium associated with said printable representation;

code means for determining a height of the content in each frame of said at least two frames;

code means for determining, for each frame of said at least two frames, a record of any corresponding dependency frames, each said dependency frame being above a respective frame of said at least two frames in said display window;

code means for interpreting the records to establish a display order of said at least two frames;

code means, operable for each frame of said at least two frames, and in said display order, to:

(a) check a start position of said each frame of said at least two frames against an end position of a created display region of a frame upon which said each frame of said at least two frames is dependent, and setting said start position to be said end position;

(b) create a display region upon a page in said printable representation at said start position according to said corresponding content height;

(c) place the content of said each frame of said at least two frames into said display region; and (d) where said display region exceeds a page limit in said printable representation, terminate the display region at the page limit and creating a further display region upon a following page of the printable representation so as to span the content of said each frame of said at least two frames across the display region and the further display region.

13. A non-transitory computer-readable storage medium according to claim 12, wherein said program forms a sub-application associated with a browser application and having a graphical user interface formed with a graphical user interface of said browser application.

14. A computer system operable to form a printable representation of a web page document having content in at least two frames, said system comprising:

means for recording the position, height and width of each frame of said at least two frames of said web page document in a display window in which said web page document is presented, means for identifying dimensions of a printing medium associated with said printable representation;

means for determining a height of the content of in each frame of said at least two frames;

means for determining, for each frame of said at least two frames frame, a record of any corresponding dependency frames, each said dependency frame being above a respective frame of said at least two frames in said display window;

means for interpreting the records to establish a display order of said at least two frames;

means, operable for each frame of said at least two frames, and in said display order, to:

(a) check a start position of said each frame of said at least two frames against an end position of a created display region of a frame upon which said each frame of said at least two frames is dependent, and setting said start position to be said end position;

(b) create a display region upon a page in said printable representation at said start position according to said corresponding content height;

(c) place the content of said each frame of said at least two frames into said display region; and (d) where said display region exceeds a page limit in said printable representation, terminate the display region at the page limit and creating a further display region upon a following page of the printable representation so as to span the content of said each frame of said at least two frames across the display region and the further display region.

\* \* \* \* \*